(12) United States Patent
Nelson et al.

(10) Patent No.: US 10,832,532 B2
(45) Date of Patent: Nov. 10, 2020

(54) AUTOMATED TRANSACTION MACHINE

(71) Applicant: Diebold Nixdorf Incorporated, North Canton, OH (US)

(72) Inventors: Donald Nelson, Akron, OH (US); Dahae Yi, Akron, OH (US); Sergio de Oliveira, Massillon, OH (US); Scott Dailey, Ann Arbor, MI (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 16/344,117

(22) PCT Filed: Oct. 23, 2017

(86) PCT No.: PCT/US2017/057903
§ 371 (c)(1),
(2) Date: Apr. 23, 2019

(87) PCT Pub. No.: WO2018/076012
PCT Pub. Date: Apr. 26, 2018

(65) Prior Publication Data
US 2020/0066110 A1 Feb. 27, 2020

Related U.S. Application Data

(60) Provisional application No. 62/411,680, filed on Oct. 23, 2016.

(51) Int. Cl.
*G07F 19/00* (2006.01)
(52) U.S. Cl.
CPC .................................. *G07F 19/205* (2013.01)
(58) Field of Classification Search
CPC ..................................................... G07F 19/205
(Continued)

(56) References Cited

U.S. PATENT DOCUMENTS 5,593,149 A * 1/1997 Kimura ................ G07D 11/245
271/3.01
5,804,804 A * 9/1998 Fukatsu .................. G07F 19/20
235/379
(Continued)

FOREIGN PATENT DOCUMENTS

| FR | 2886330 | | 12/2006 |
| GB | 2025106 | A | 1/1980 |
| WO | 9729444 | A1 | 8/1997 |

OTHER PUBLICATIONS

International Preliminary Report on Patentability and Written Opinion filed in the corresponding PCT Application; 8 pages.
(Continued)

*Primary Examiner* — Michael G Lee
*Assistant Examiner* — David Tardif
(74) *Attorney, Agent, or Firm* — Black, McCuskey, Souers & Arbaugh LPA

(57) ABSTRACT

An automated transaction machine can include at least one currency cassette, a currency recycler, a user interface, a transceiver, a shell, a door, a slot, and a cart. The currency recycler can extract banknotes held by the currency cassette. The user interface can receive an input from a user corresponding to a request for currency dispensing. The transceiver can transmit the input remotely for approval. The shell can have an interior at least partially enclosing the currency cassette and the door can close the interior. The cart can have a holding portion and a plurality of wheels. The currency cassette can be carried by the holding portion and rest on the wheels. Lowermost edges of the wheels can be lower than lowermost edges of the holding portion and the currency cassette when the currency cassette is in the interior.

30 Claims, 27 Drawing Sheets

(58) Field of Classification Search
USPC .......................................................... 235/379
See application file for complete search history.

(56) References Cited

U.S. PATENT DOCUMENTS

| | | | | |
|---|---|---|---|---|
| 6,036,089 | A * | 3/2000 | Oguchi | .................. G07F 19/20 |
| | | | | 235/379 |
| 6,082,616 | A * | 7/2000 | Lewis | .................. G07F 19/205 |
| | | | | 235/379 |
| 6,845,905 | B2 * | 1/2005 | Blad | .................. G06Q 20/1085 |
| | | | | 235/375 |
| 7,395,965 | B2 * | 7/2008 | Franks, Jr. | ........... G07D 11/009 |
| | | | | 235/379 |
| 2005/0189266 | A1 | 9/2005 | Fujita | |
| 2010/0059330 | A1 | 3/2010 | Georgens | |
| 2011/0132718 | A1 | 6/2011 | Park et al. | |

OTHER PUBLICATIONS

International Search Report filed in the corresponding PCT Application; 7 pages.

* cited by examiner

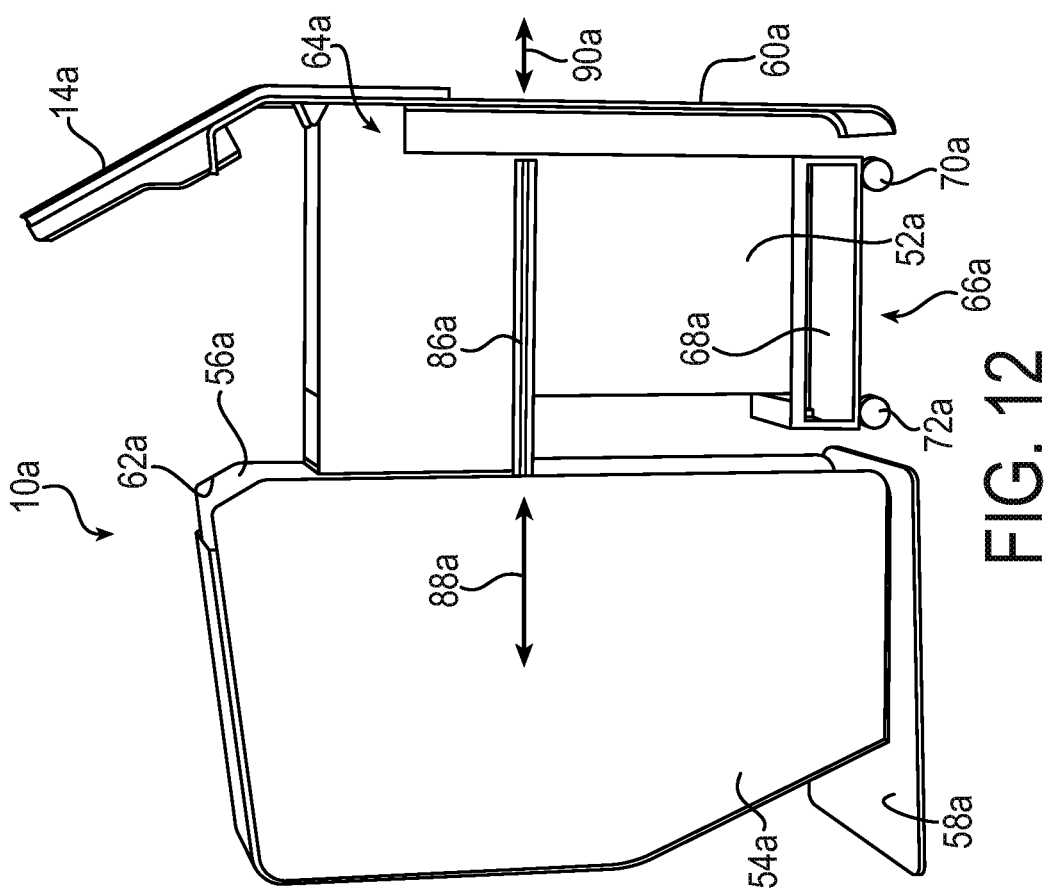
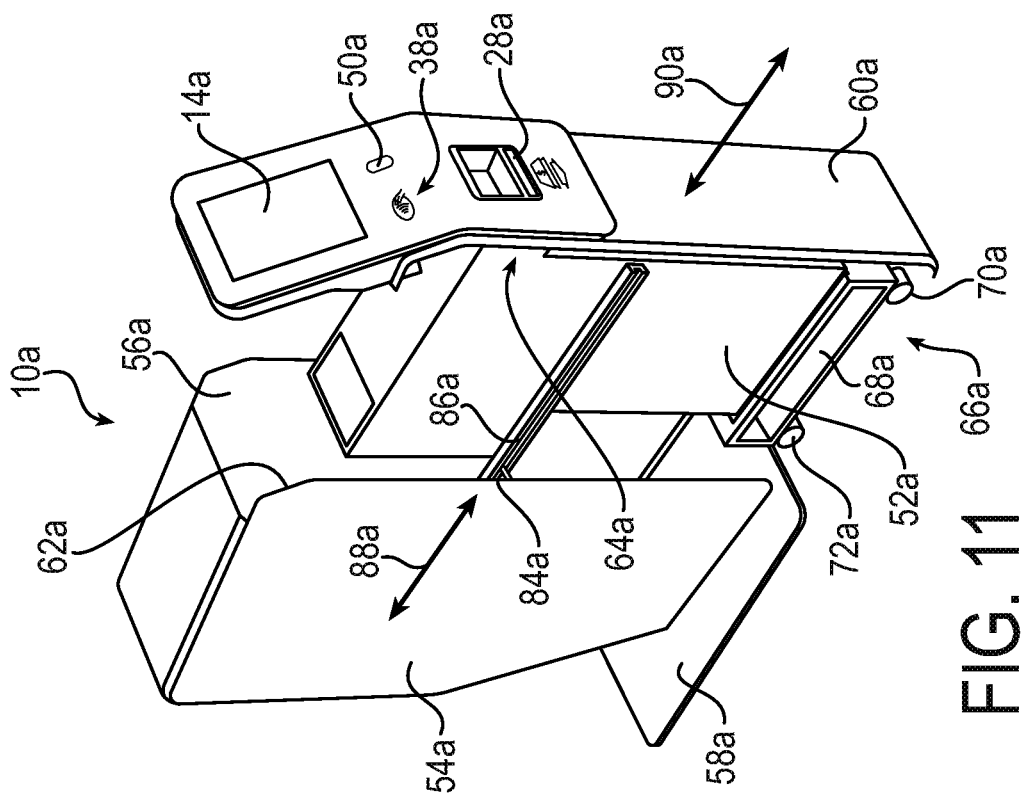

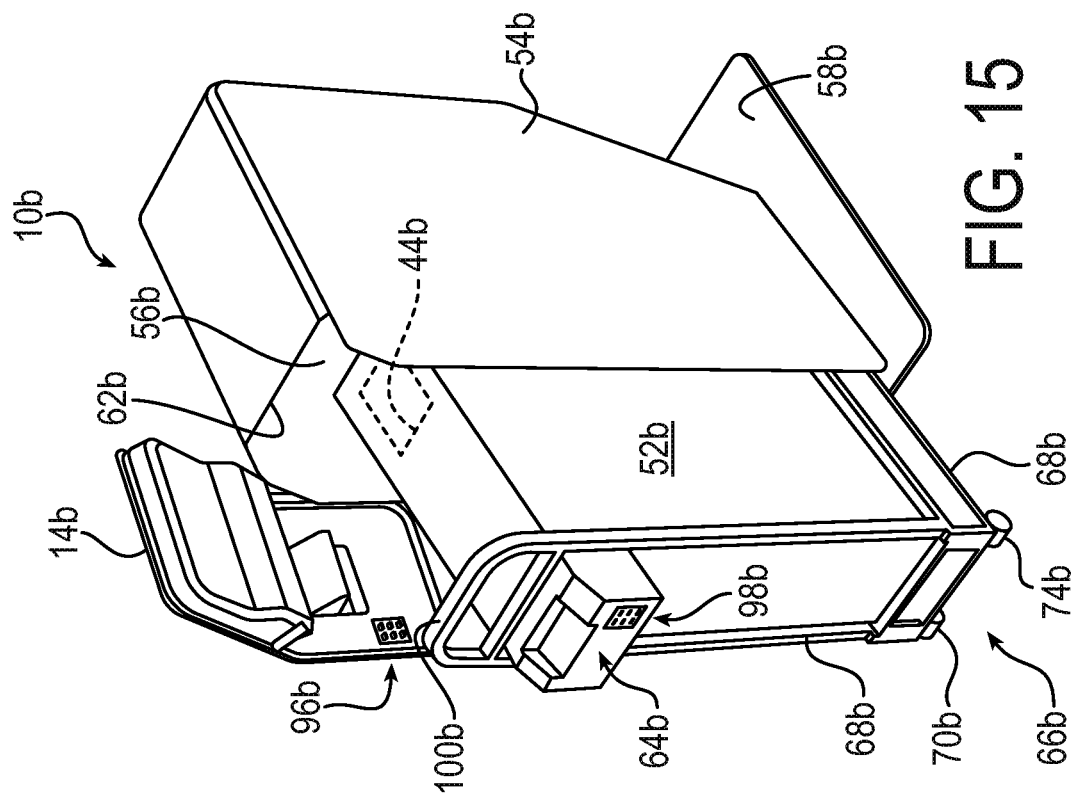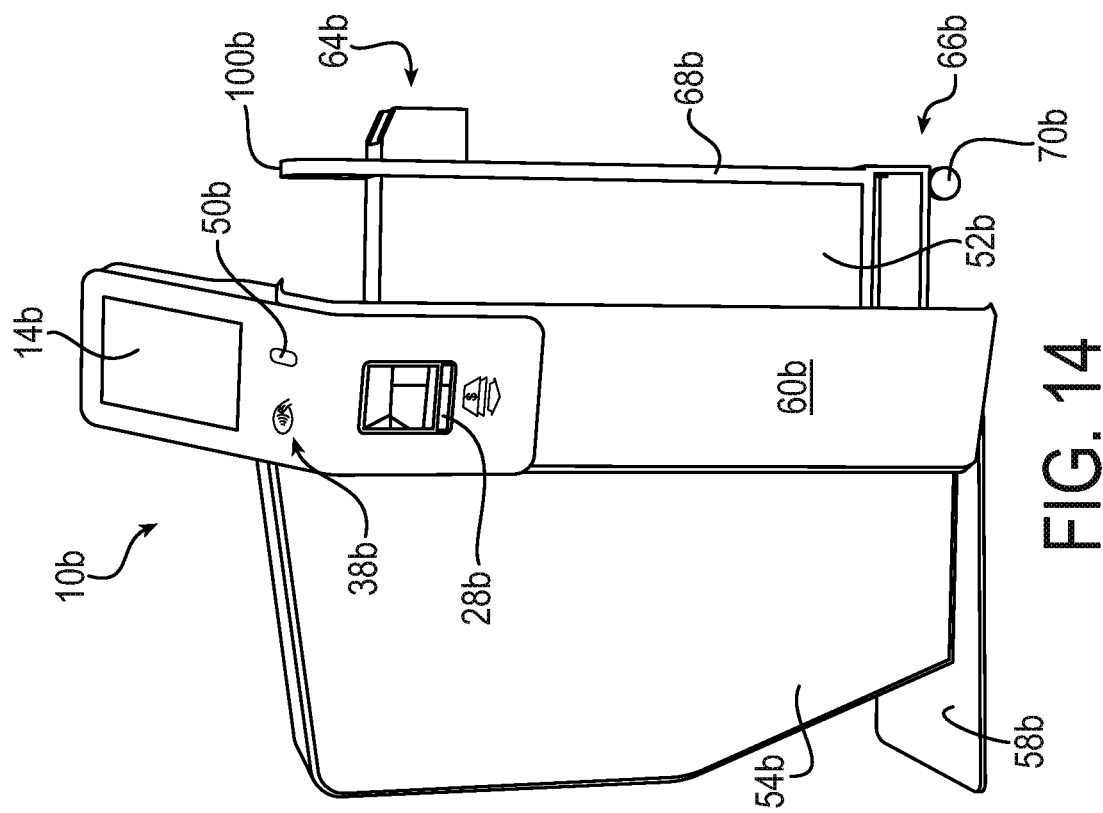

AUTOMATED TRANSACTION MACHINE

CROSS-REFERENCE TO RELATED APPLICATIONS

This application claims the benefit of International Application No. PCT/US2017/057903, filed Oct. 23, 2017, and also the benefit of U.S. Provisional Patent Application Ser. No. 62/411,680, filed on Oct. 23, 2016, which are hereby incorporated by reference in their entireties.

BACKGROUND

1. Field

The present disclosure relates to automated transaction machines.

2. Description of Related Prior Art

Automated transactions machines, hereafter "ATMs," are commonly used to carry out a variety of financial or commercial transactions. Most commonly, these transactions include dispensing cash, providing checking account balances, paying bills and/or receiving deposits from users. ATMs may also perform a variety of other transactions, including the sale and purchase of tickets, issuance of coupons, check or voucher presentation, the printing of script and a variety of other functions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automated transaction machine can include at least one currency cassette, a currency recycler, a user interface, a transceiver, a shell, a door, a slot, and a cart. The at least one currency cassette can be configured to a hold a plurality of banknotes. The currency recycler can be configured to selectively extract one or more of the plurality of banknotes held by the at least one currency cassette. The user interface can be configured to receive an input from a user. The input can correspond to at least part of a request for currency dispensing. The transceiver can be configured to communicate with the user interface and can be configured to receive the input and transmit the input remotely for approval of the request for currency dispensing. The shell can have an interior sized to at least partially enclose the at least one currency cassette and the currency recycler. The door can be configured to selectively close the interior of the shell. The slot can be formed in the door. The currency recycler, when positioned in the interior, can be aligned with the slot and can be configured to direct the one or more banknotes extracted from the at least one currency cassette through the slot. The cart can have a holding portion and a plurality of wheels. The holding portion can rest on the plurality of wheels. The shell can have an opening sized to receive the cart. The at least one currency cassette can be carried by the holding portion and also rests on the plurality of wheels through the holding portion when the at least one currency cassette is in the interior. Respective, lowermost edges of the plurality of wheels can be positioned lower than a lowermost edge of the holding portion and lower than a lowermost edge of the at least one currency cassette when the at least one currency cassette is in the interior.

BRIEF DESCRIPTION OF THE DRAWINGS

The detailed description set forth below references the following drawings:

FIG. 11 is another perspective view of the ATM of FIG. 2, showing components of the ATM associated with currency dispensing being removed from an external shell of the ATM;

FIG. 12 is a perspective view of the ATM of FIG. 2, generally from the side, showing the components of the ATM associated with currency dispensing being removed from the external shell of the ATM;

FIG. 14 is a perspective view of the ATM of FIG. 13, generally from the side, showing the components of the ATM associated with currency dispensing being removed from the external shell of the ATM;

FIG. 15 is another perspective view of the ATM of FIG. 13, showing the components of the ATM associated with currency dispensing being removed from the external shell of the ATM;

DETAILED DESCRIPTION

Figure 1:
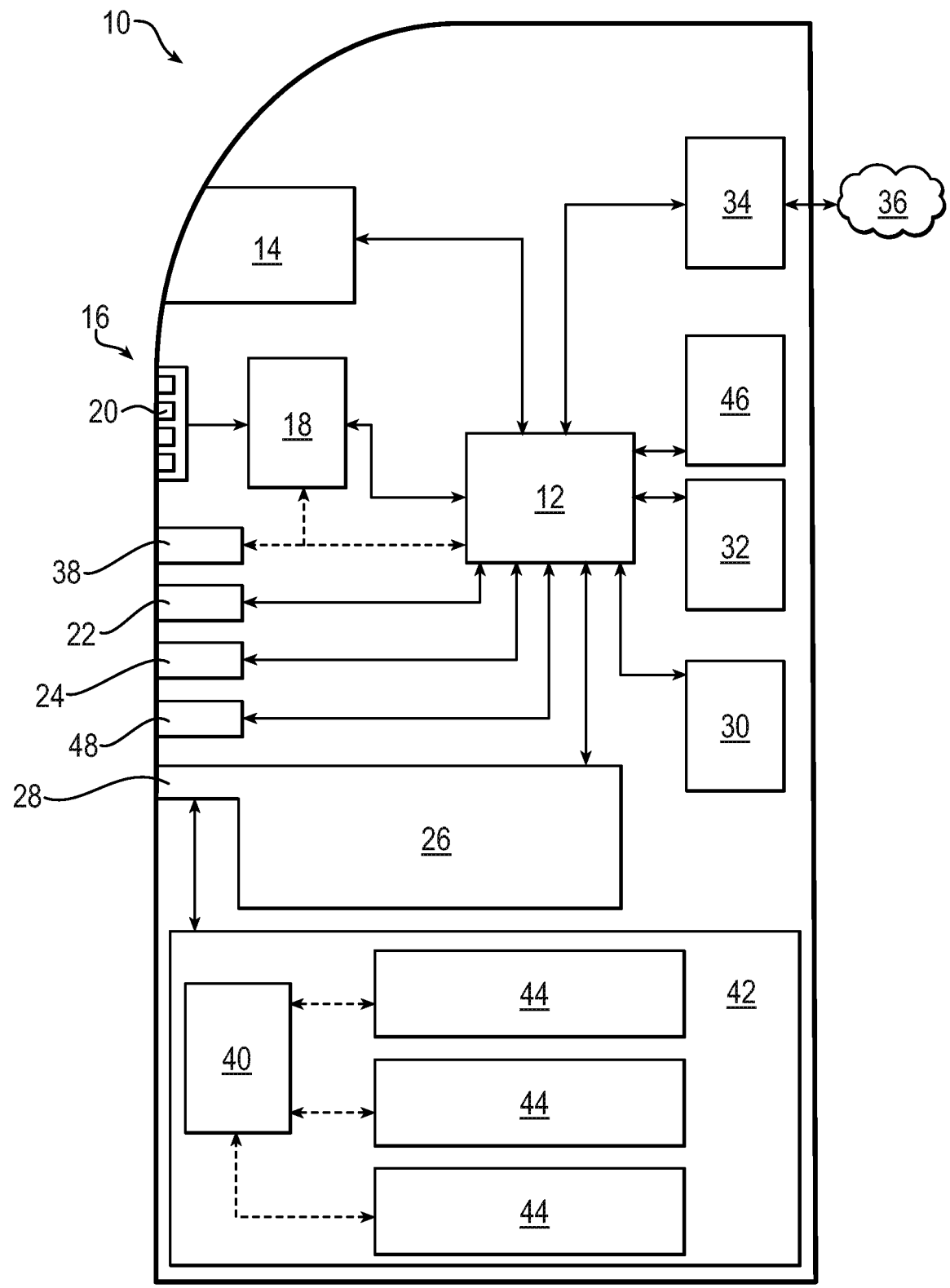
FIG. 1 is a schematic, functional block diagram of an exemplary ATM according to one or more implementations of the present disclosure.
Figure 2:
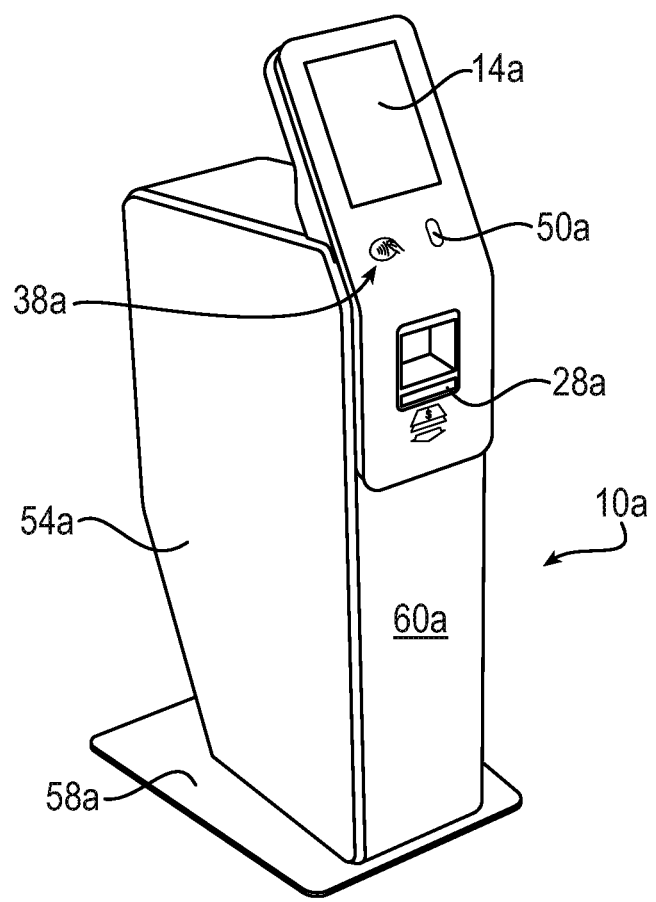
FIG. 2 is a perspective view of an ATM according to one or more implementations of the present disclosure.
Figure 3:
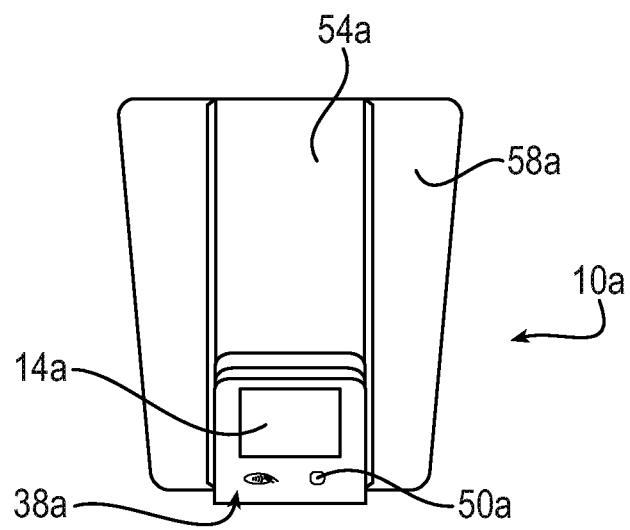
FIG. 3 is a top view of the ATM shown in FIG. 2.
Figure 4:
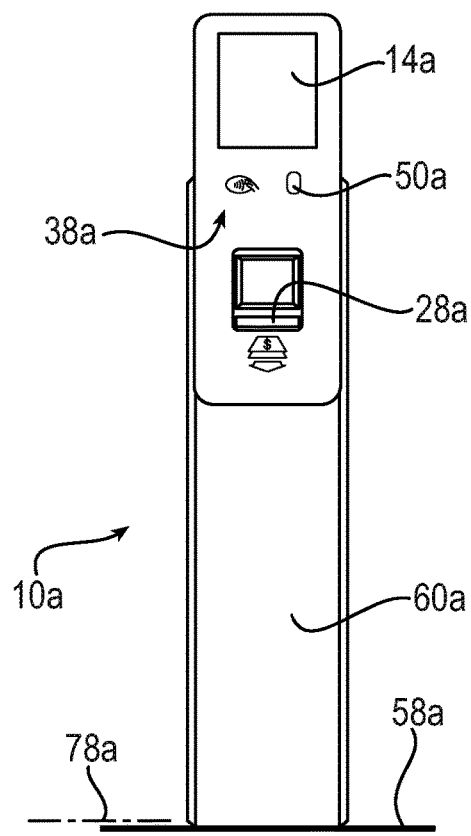
FIG. 4 is a front view of the ATM shown in FIG. 2.

A plurality of different implementations of the present disclosure is shown in the Figures of the application. Similar features are shown in the various implementations of the present disclosure. Similar features shown across different implementations have been numbered with a common reference numeral and have been differentiated by an alphabetic suffix. Also, to enhance consistency, the structures in any particular drawing share the same alphabetic suffix even if a particular feature is shown in less than all implementations. Similar features are structured similarly, operate similarly, and/or have the same function unless otherwise indicated by the drawings or this specification. Furthermore, particular features of one implementation can replace corresponding features in another implementation or can supplement other implementations unless otherwise indicated by the drawings or this specification.

The present disclosure, as demonstrated by the exemplary implementations, described below, can provide an ATM with an external shell and components associated with currency dispensing positioned within the shell. User interfaces can be positioned on a door that closes the shell. Currency cassettes of the ATM can be easily removable from the external shell to allow the cassettes to be stored elsewhere when the ATM is not in use. For example, the cassettes can be taken out of the shell of the ATM and stored in another room. Further, components of the ATM associated with currency dispensing, other than the cassettes, can be removeable and stored elsewhere during time periods when the ATM is not in use.

In one exemplary operating environment, an ATM may be positioned near a window inside a convenience store. Thieves have been known to drive vehicles into a store when the store is closed, at a location near the ATM, in order to take the entire ATM. An ATM according to one or more implementations of the present disclosure can be utilized in the exemplary operating environment to deter such actions and prevent loss. For example, the cassettes and other components of the ATM associated with currency dispensing can be removed and stored elsewhere during time periods when the store is closed and the ATM is not in use. If an aspiring thief can see that the ATM is fully or partially empty, the thief will be disincentivized from driving into the building in order to take the ATM. This is one example of a benefit provided by the present disclosure and should not be viewed as the only benefit.

Referring now to the drawings, FIG. 1 discloses a functional block diagram of an exemplary ATM 10 according to one or more implementations of the present disclosure. The ATM 10 includes different structures and subsystems for receiving input from a user and executing transactions. Implementations of the present disclosure that are shown in detail in FIGS. 2-24 can include one or more of the components shown schematically in FIG. 1 and described below.

The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary implementation, the article exchange unit 26 is configured to receive items such as checks. An exemplary article exchange unit 26 can include a drum on which received items are stored. The exemplary article exchange unit 26 includes a slot 28 open to an exterior of the ATM 10 for the receipt of such items. In other implementations of the present disclosure, an article exchange unit can be configured to facilitate the receipt of other items, different than paper. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes a currency recycler or advanced function dispenser (AFD) 40. The AFD 40 can dispense banknotes, such as currency, and also receive banknotes. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The AFD 40 thus communicates with the slot 28 in parallel with the article exchange unit 26. The exemplary AFD 40 can communicate with and be controlled by the computing device 12 for at least some operations. Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

As illustrated in FIGS. 2-12, an exemplary ATM 10*a* includes at least one currency cassette configured to a hold a plurality of banknotes and a currency recycler configured to selectively extract one or more of the plurality of banknotes held by the at least one currency cassette. The cassette 44 and dispenser 40 described above and illustrated schematically in FIG. 1 can be utilized in the ATM 10*a*. In FIGS. 11 and 12, a structure containing both of the at least one currency cassette and the currency recycler is referenced at 52*a* and is designated a composite currency unit.

The exemplary ATM 10*a* includes a plurality of user interfaces. A user interface in the form of a display 14*a* is a touch screen display that can display information to a user and receive data from the user. A user interface in the form of a transceiver 38a can communicate with a computing device of a user, such as a smartphone. The communication protocol between the transceiver 38a and the smartphone can be NFC or Bluetooth. A user interface in the form of a biometric sensor 50a can detect the fingerprint of a user. The input that is received from the user with one or all of the user interfaces 14a, 38a, 50a can correspond to a request for currency dispensing. For example, the user can enter a personal identification number (PIN), a desired amount of currency, and/or data associated with a pre-staged transaction through the display 14a or with a smartphone through the transceiver 38a. Alternatively, the user can place his/her finger on the biometric sensor 50a for the ATM 10a to search for and access a pre-staged transaction based on the fingerprint data or to confirm the user's identity before currency is dispensed. Other implementations of the present disclosure can incorporate user interfaces having other forms, such as by way of example and not limitation, a key pad.

The exemplary ATM 10a includes a second transceiver communicating with the user interface, such as transceiver 34 illustrated schematically in FIG. 1. This second transceiver of the ATM 10a is internal relative to the structure shown in FIGS. 2-12 and therefore not visible. The second transceiver can be configured to receive the input received by a user interface, such as any of the exemplary user interfaces set forth above. The communication of the input to the second transceiver can be direct from the user interface or indirect, such as through the computing device 12 illustrated in FIG. 1. The second transceiver is configured to transmit the input remotely, such as to a bank server or a switch on the ATM network, for approval of the request for currency dispensing.

The exemplary ATM 10a includes a shell 54a having an interior 56a sized to at least partially enclose the at least one currency cassette and the currency recycler, referenced by the composite currency unit 52a. The exemplary shell 54a partially encloses the composite currency unit 52a on five sides: top, bottom, left, right, and rear. The exemplary shell 54a is mounted on a plate 58a. In one or more other implementations of the present disclosure, a shell could enclose four sides, such as if the plate formed the bottom side of the interior 56a. The exemplary shell 54a can be formed from sheet metal or plastic and can be relatively thin and light-weight.

The exemplary ATM 10a includes a door 60a configured to selectively close the interior 56a of the shell 54a. In other words, the door 60a is arranged to be moveable between a first position and a second position. In the first position, the door 60a closes an opening 62a in the shell 54a to the interior 56a. The exemplary door 60a thus closes a sixth side of the shell 54a, the front side, when in the first position. The door 60a is shown in FIGS. 2-10 in the first position. In the second position, the door 60a is spaced from the first position and the opening 62a in the shell 54a to the interior 56a is unblocked. The door 60a is shown in FIGS. 11 and 12 in an exemplary second position. Alternative second positions could be defined when the door 60a is more remote from the shell 54a than shown in FIGS. 11 and 12. As illustrated in the Figures, in the exemplary implementation, the opening 62a to the interior 56a and the user interfaces 14a, 38a, 50a are on the same side of the shell 54a when the opening 62a is closed by the door 60a, the front side. Although not illustrated, it is noted that a lock can be arranged to selectively lock the door 60a in the first position.

The exemplary ATM 10a includes a slot 28a formed in the door 60a. The currency recycler, when positioned in the interior 56a, is aligned with the slot 28a and is configured to direct banknotes that have been extracted from the currency cassette through the slot 28a. The exit port of the composite currency unit 52a is referenced at 64a.

The exemplary ATM 10a includes a cart 66a. The cart 66a has a holding portion 68a and a plurality of wheels, such as wheels 70a and 72a. The exemplary cart 66a includes two other wheels opposite to the wheels 70a, 72a, on an opposite side of the holding portion 68a. The holding portion 68a rests on the plurality of wheels 70a, 72a and the wheels that are not visible in the Figures. The exemplary holding portion 68a is supported by the plurality of wheels 70a, 72a and the wheels that are not visible in the Figures. The exemplary holding portion 68a is carried by the plurality of wheels 70a, 72a and the wheels that are not visible in the Figures. The weight of the exemplary holding portion 68a is transmitted to the plurality of wheels 70a, 72a and the wheels that are not visible in the Figures, to a bottom portion of the shell 54a and not sides of the shell 54a, and then to the plate 58a.

The opening 62a of the exemplary shell 54a is sized to receive the cart 66a. The exemplary cart 66a is moveable fully in and fully out of the interior 56a of the shell 54a while the at least one currency cassette and the currency recycler (combined in the exemplary composite currency unit 52a) are carried by the holding portion 68a and resting on the plurality of wheels 70a, 72a and the wheels that are not visible in the Figures. Thus, the currency cassette is carried by the holding portion 68a and also rests on the plurality of wheels 70a, 72a and the wheels that are not visible in the Figures, through the holding portion 68a, when the currency cassette is in the interior 56a.

The exemplary cart 66a and exemplary shell 54a are thus selectively engagable with one another. In other words, the exemplary cart 66a can be wheeled into the exemplary shell 54a, the door 60a shut (the first position), and the ATM 10 can then be used to dispense currency. Further, the door 60a can be opened, the exemplary cart 66a can be wheeled out of the shell 54a and be unconnected with the shell 54a without damage to the exemplary cart 66a or the exemplary shell 54a, and then reengaged again to accomplish currency dispensing. Further, either the exemplary cart 66a or the exemplary shell 54a can be replaced with a newer version and engage the remaining component.

Figure 5:
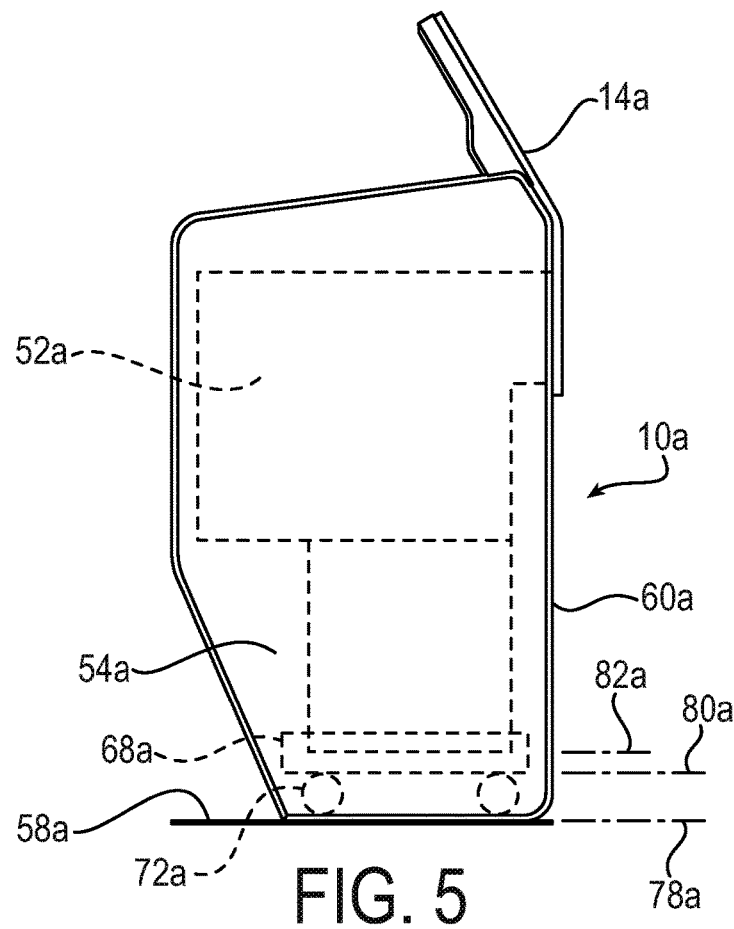
FIG. 5 is a left side view of the ATM shown in FIG. 2.
Figure 7:
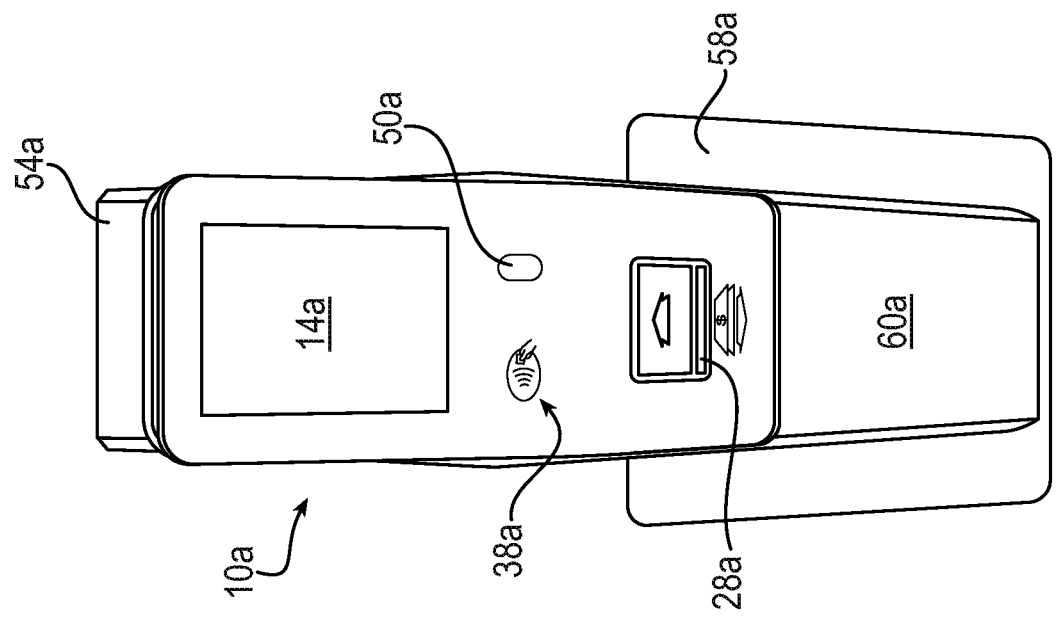
FIG. 7 is another perspective view of the ATM shown in FIG. 2.
Figure 6:
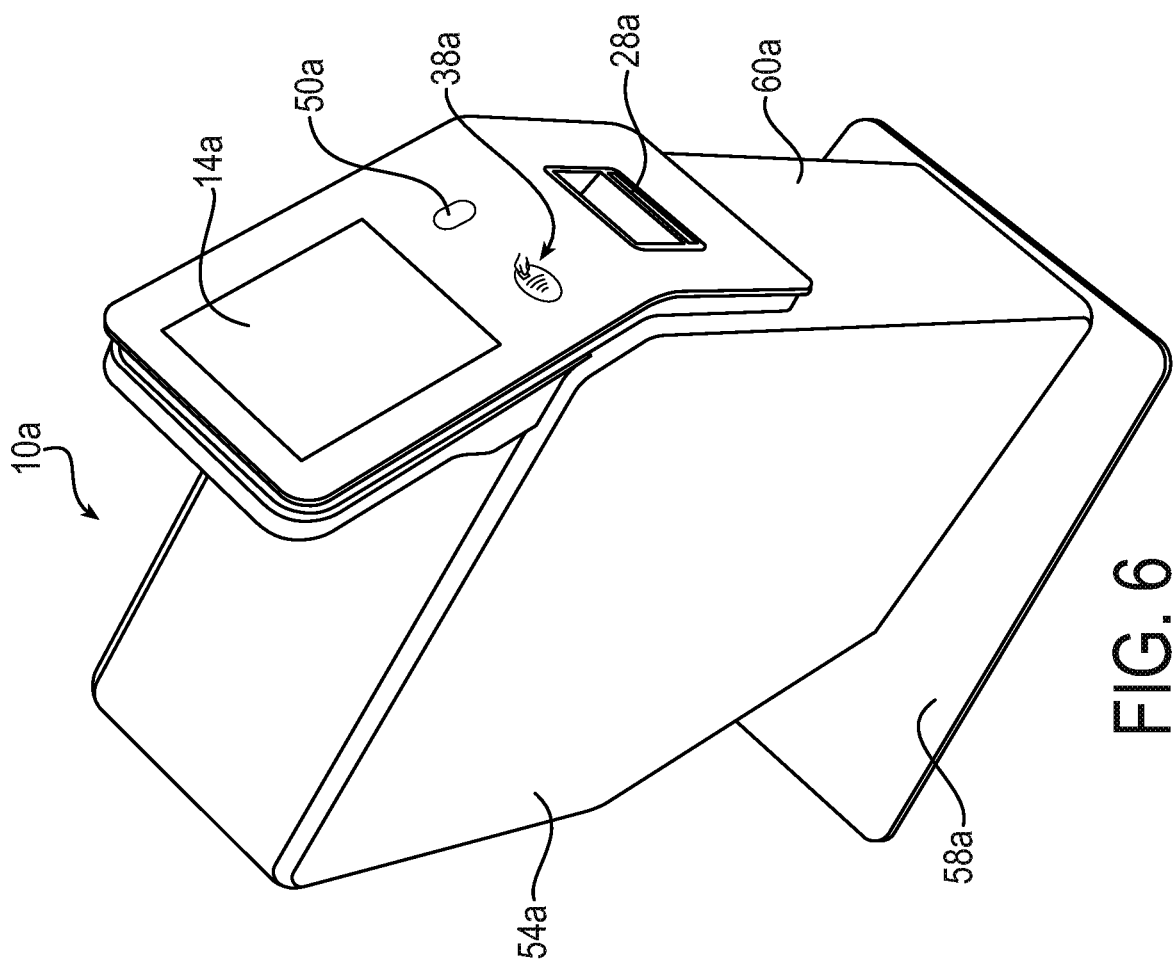
FIG. 6 is another perspective view of the ATM shown in FIG. 2.
Figure 9:
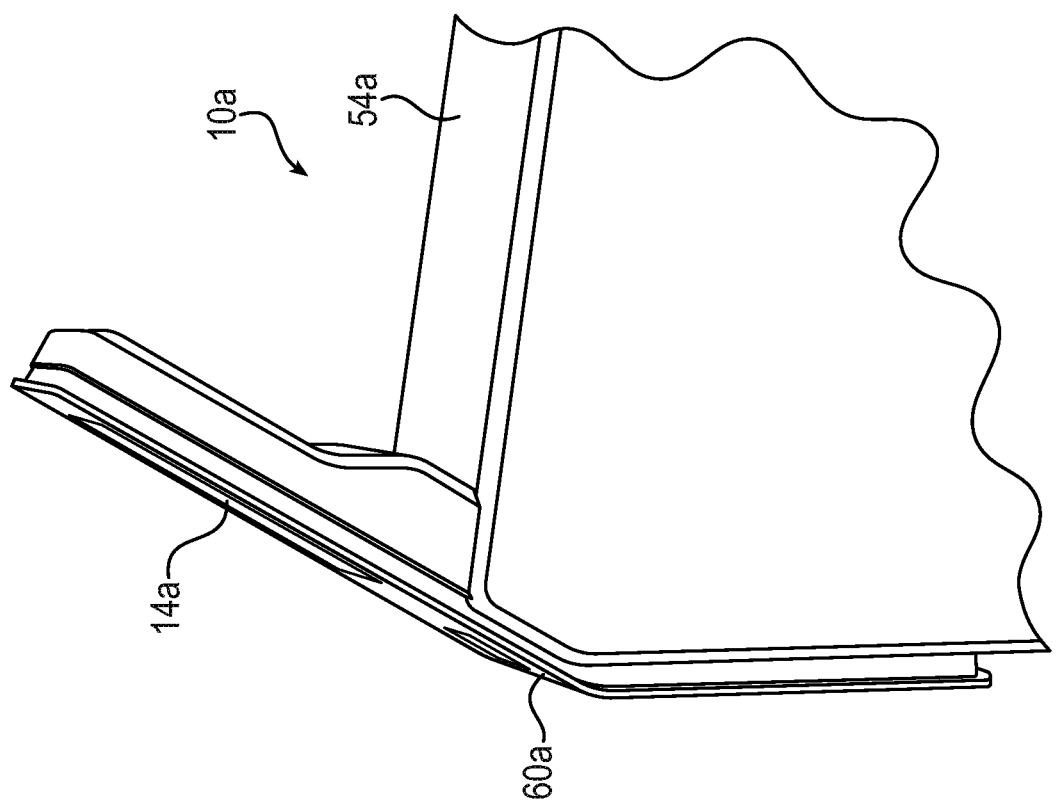
FIG. 9 is another partial perspective view of the ATM shown in FIG. 2.
Figure 8:
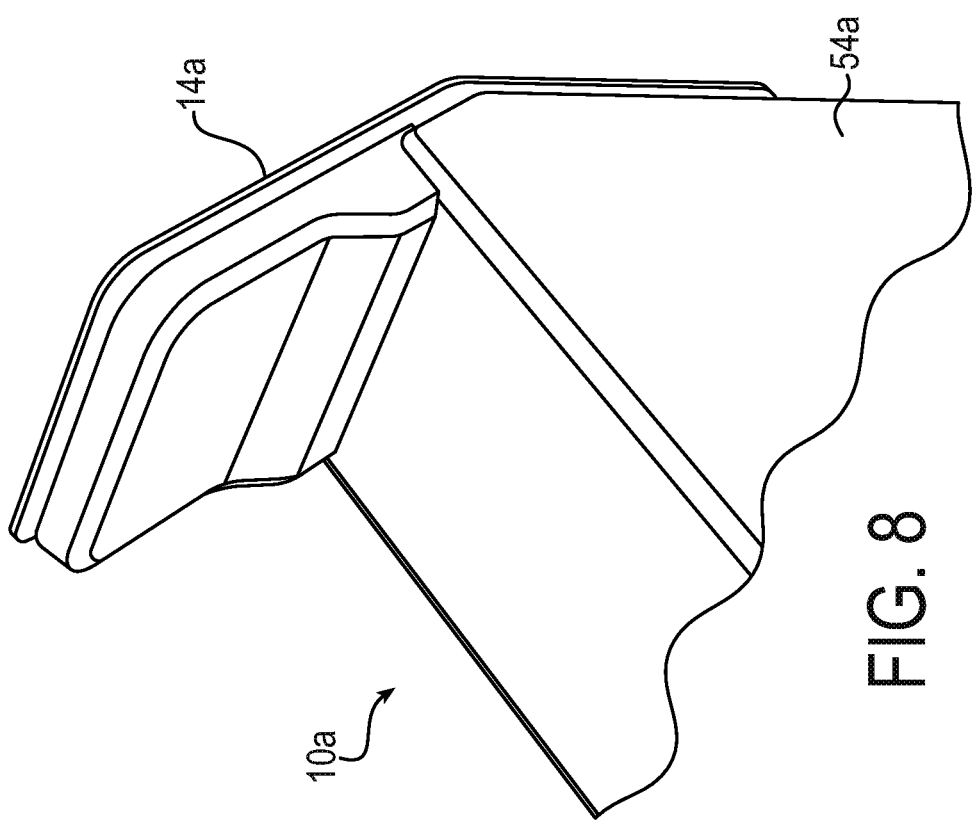
FIG. 8 is a partial perspective view of the ATM shown in FIG. 2.

Respective lowermost edges of the plurality of wheels 70a, 72a and the wheels that are not visible in the Figures contact a plane referenced at 78a, referenced in FIG. 5. A lowermost edge of the holding portion 68a is in a plane referenced at 80a. A lowermost edge of the at least one currency cassette is no lower than a lowermost edge of the composite currency unit 52a, which is in a plane referenced at 82a. As shown in FIG. 5, the lowermost edges of the plurality of wheels 70a, 72a and the wheels that are not visible in the Figures are positioned lower than the lowermost edge of the holding portion 68a because the plane 78a is lower than the plane 80a. As is also shown in FIG. 5, the lowermost edges of the plurality of wheels 70a, 72a and the wheels that are not visible in the Figures are positioned lower than the lowermost edge of the currency cassette when the at least one currency cassette is in the interior because the plane 78a is lower than the plane 82a. Thus, a weight of the at least one currency cassette is not transmitted to sides of the shell 54a in the exemplary ATM 10a, but to a bottom or floor portion of the shell 54a through the wheels 70a, 72a and the wheels that are not visible in the Figures.

In the exemplary ATM 10a, the currency recycler, as part of the composite current unit 52a, is also carried by the holding portion 68a and also rests on the plurality of wheels 70a, 72a and the wheels that are not visible in the Figures, through the holding portion 68a, when the currency recycler is in the interior 56a. A lowermost edge of the currency recycler is no lower than the lowermost edge of the composite currency unit 52a, which is in the plane 82a. Therefore, the respective lowermost edges of the plurality of wheels 70a, 72a and the wheels that are not visible in the Figures are positioned lower than a lowermost edge of the currency recycler when the currency recycler is in the interior 56a.

As best shown in FIGS. 11 and 12, the exemplary user interfaces 14a, 38a, and 50a are mounted on the door 60a and the door 60a is mounted on the composite currency unit 52a. Thus, the exemplary user interfaces 14a, 38a, and 50a are carried by the holding portion 68a and also rest on the plurality of wheels 70a, 72a and the wheels that are not visible in the Figures, through the holding portion 68a, when the currency recycler is in the interior 56a as well as when the currency recycler is not in the interior 56a. In the exemplary implementation, the respective lowermost edges of the plurality of wheels 70a, 72a and the wheels that are not visible in the Figures (in plane 78a) are positioned lower than a lowermost edge of the user interfaces 14a, 38a, and 50a, as shown by a comparison between FIGS. 4 and 5.

The exemplary ATM 10a also includes a guide track 84a positioned in the interior 56a. The exemplary ATM 10a also includes a rail 86a engaged, directly or indirectly, with the cart 66a. The exemplary rail 86a extends along a longitudinal axis 88a that is parallel to or colinear with an axis 90a of movement of the cart 66a in and out of the interior 56a. The exemplary rail 86a and the exemplary guide track 84a are engageable with one another upon movement of the cart 66a into the interior 56a. The rail 86a and the guide track 84a can engage one another in a tongue and groove, or spline type arrangement. The exemplary cart 66a thus engages the guide track 84a during movement into the interior 56a.

Figure 10:
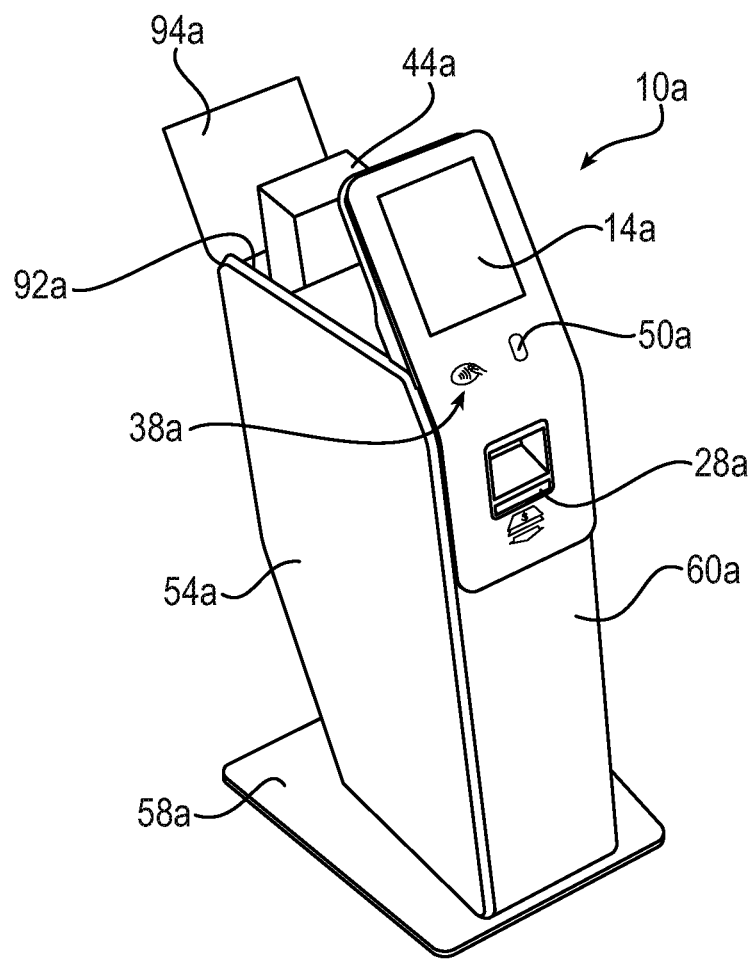
FIG. 10 is another perspective view of the ATM of FIG. 2, showing a currency cassette being removed.

As shown in FIG. 10, the exemplary ATM 10a also includes a second opening 92a in the shell 54a to the interior 56a. The exemplary ATM 10a also includes a hatch 94a mounted on the shell 54a. The exemplary hatch 94a is spaced from the door 60a. The exemplary hatch 94a is moveable between a first position closing the second opening 92a and second position spaced from the first position. The currency cassette 44a is accessible through the second opening 92a when the hatch 94a is away from the first position.

Figure 25:
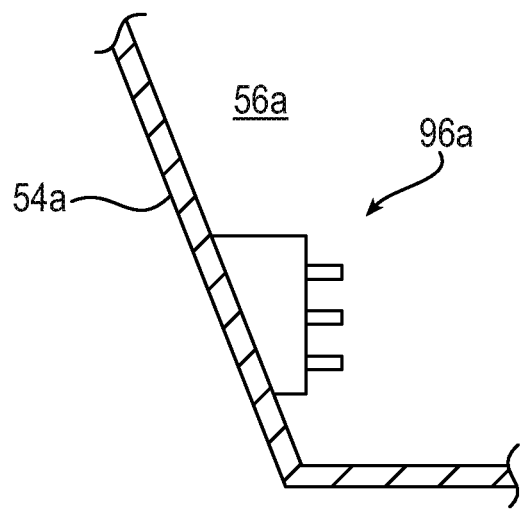
FIG. 25 is a detail view of a portion of an interior of a shell of the ATM shown in FIG. 2.
Figure 26:
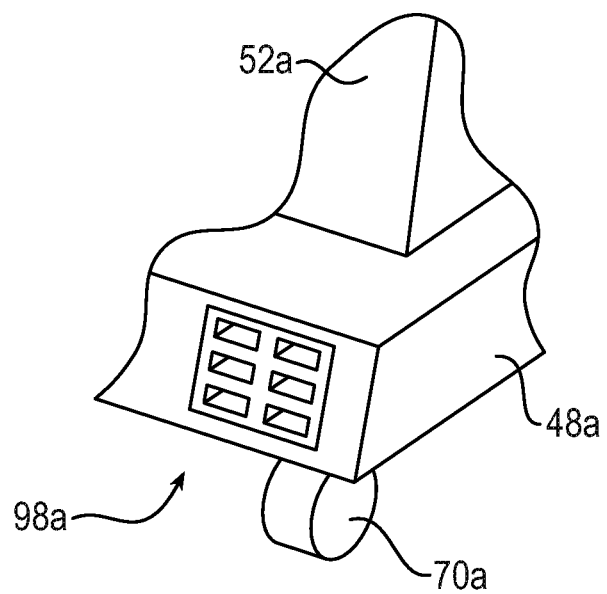
FIG. 26 is a detail view of a portion of a cart that is a portion of the ATM shown in FIG. 2.
Figure 27:
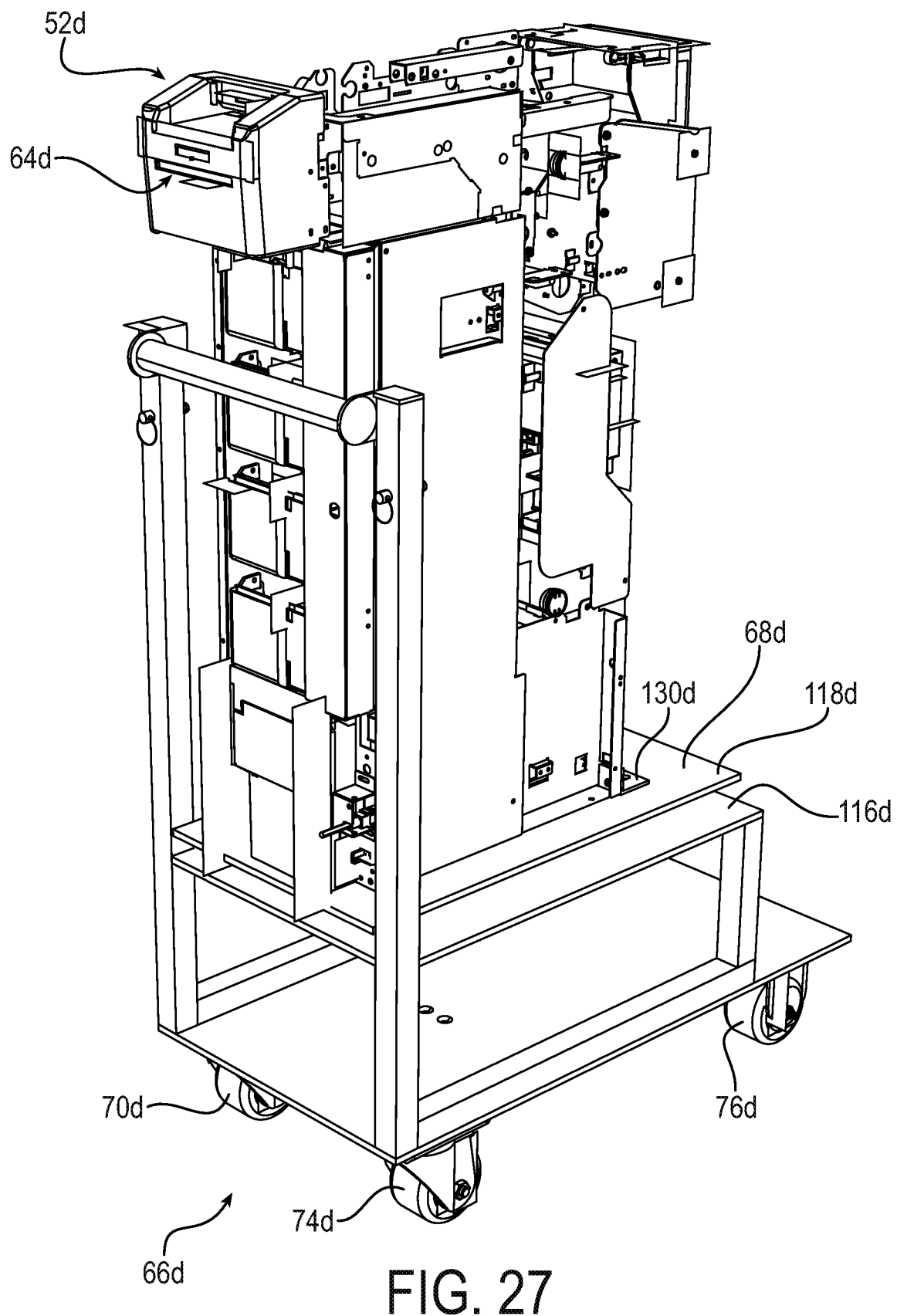
FIG. 27 is a perspective view of a cart and a composite currency unit according to another implementation of the present disclosure.
Figure 28:
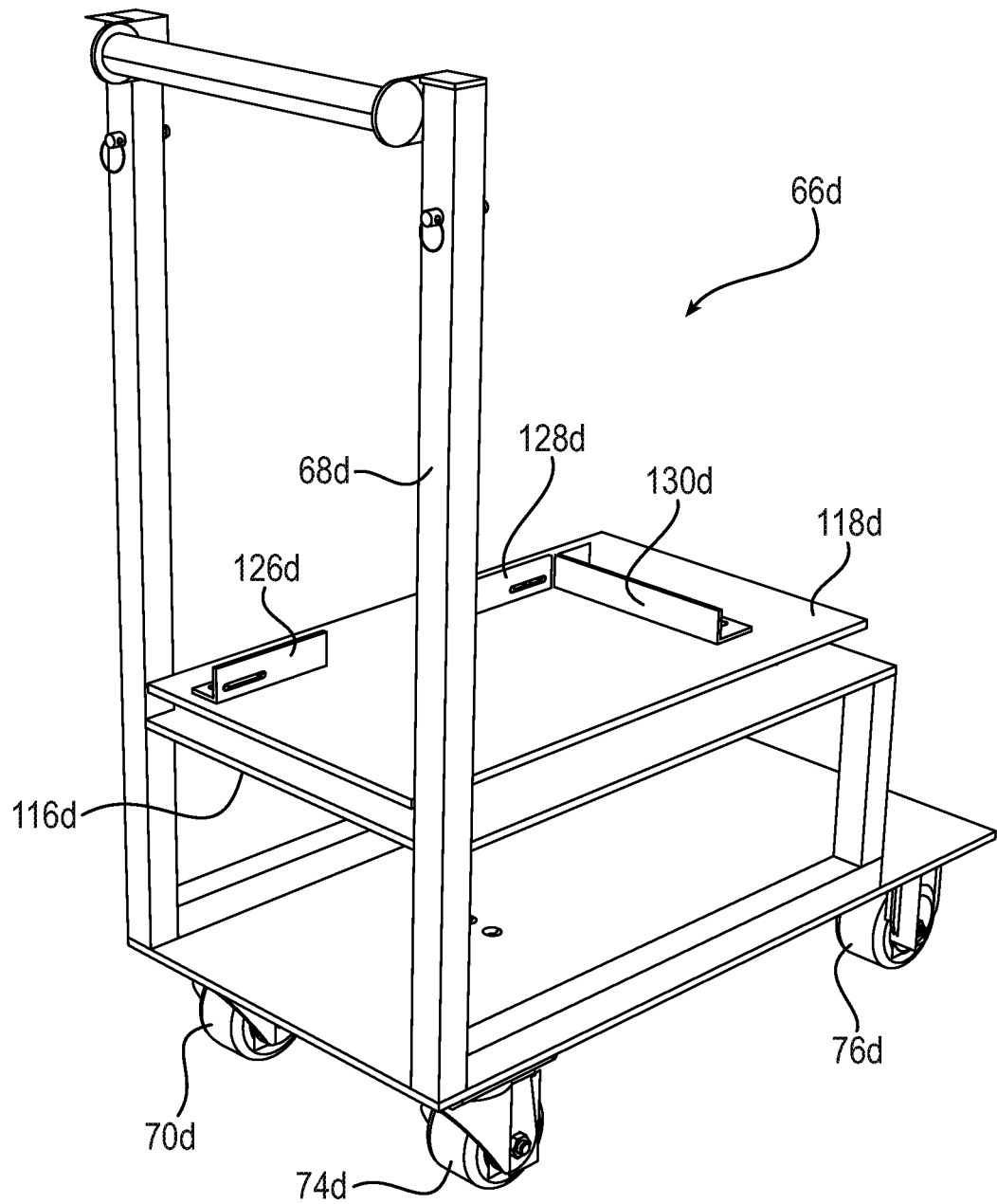
FIG. 28 is a first perspective view of the cart shown FIG. 27 with the composite currency unit removed.
Figure 29:
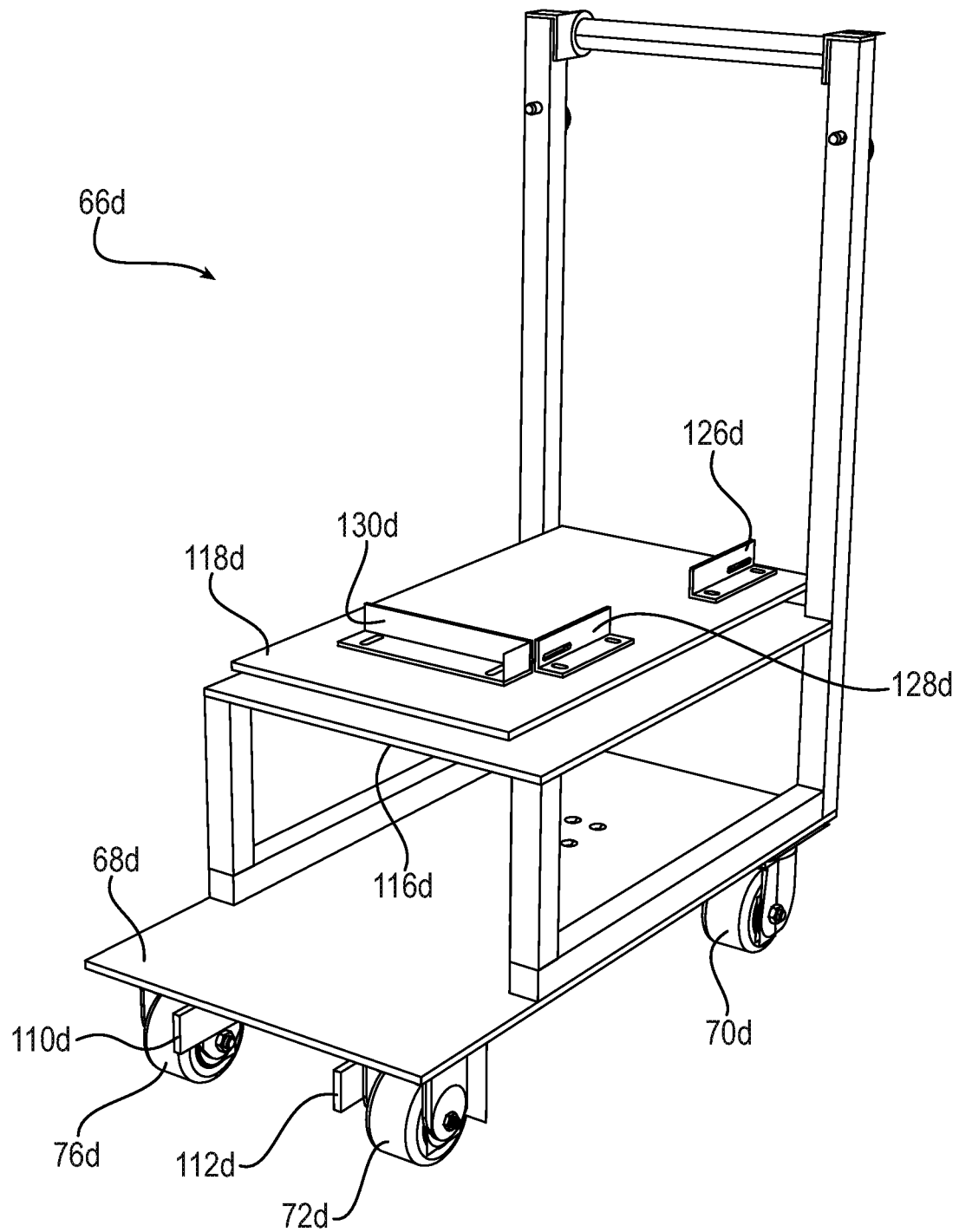
FIG. 29 is a second perspective view of a cart of FIG. 27.

As best shown in FIGS. 25 and 26, the exemplary ATM 10a also includes a first electrical coupling 96a and a second electrical coupling 98a. The exemplary first electrical coupling 96a is mounted to the shell 54a. The first electrical coupling 96a can be male or female coupling, can include both male prongs and female sockets, and/or can include flat contacts. The exemplary second electrical coupling 98a is mounted in the holding portion 68a. The second electrical coupling 98a can be male or female coupling, can include both male prongs and female sockets, and/or can include flat contacts. The first electrical coupling 96a and the second electrical coupling 98a come into engagement with one another when the cart 66a is rolled into the interior 56a. As referenced by dash lines in FIG. 26, electrical data and/or power signals can be communicated through the couplings 96a, 98a. Such signals can be directed to any components positioned within the composite currency unit 52a. Similar couplings can be utilized between the holding portion 48a and the composite currency unit 52a so that when the composite currency unit 52a is lowered onto the holding portion 48a the electrical connection is completed.

Figure 13:
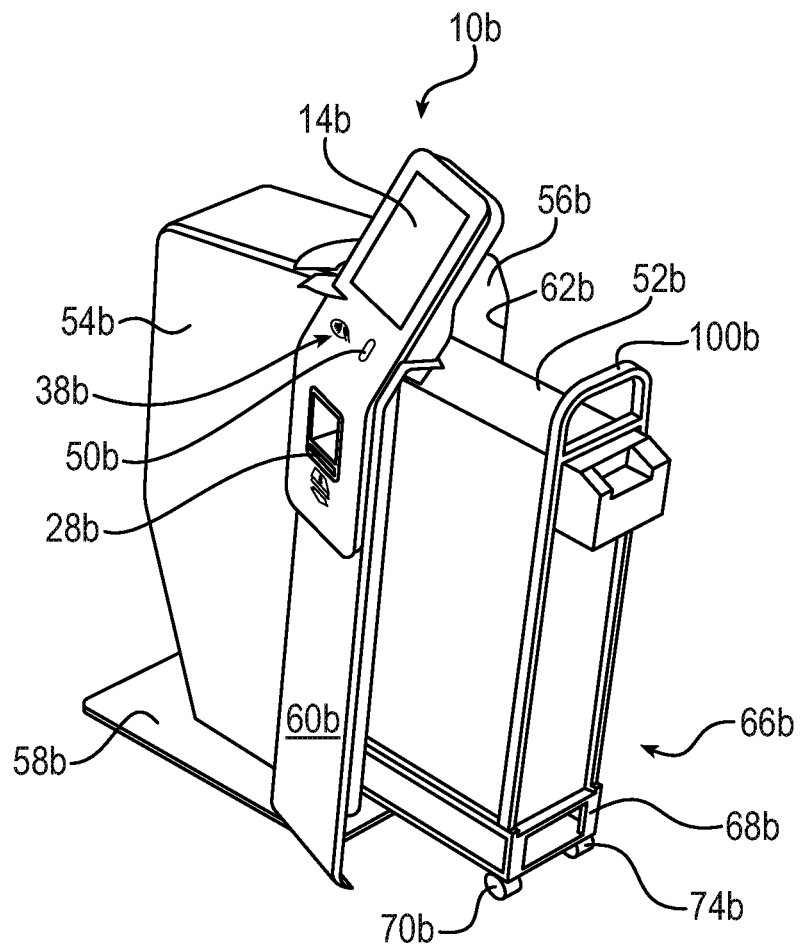
FIG. 13 is a perspective view of an ATM according to one or more implementations of the present disclosure, showing components of the ATM associated with currency dispensing being removed from an external shell of the ATM.

As illustrated in FIGS. 13-15, an exemplary ATM 10b includes at least one currency cassette configured to a hold a plurality of banknotes and a currency recycler configured to selectively extract one or more of the plurality of banknotes held by the at least one currency cassette, such as the cassette 44 and dispenser 40 illustrated schematically in FIG. 1. In FIGS. 13-15, a structure containing both of the at least one currency cassette and the currency recycler is referenced at 52b in the form of a composite currency unit.

The exemplary ATM 10b includes a plurality of user interfaces. A user interface in the form of a display 14b is a touch screen display that can display information to a user and receive data from the user. A user interface in the form of a transceiver 38b can communicate with a computing device of a user, such as a smartphone. The communication protocol can be NFC or Bluetooth. A user interface in the form of a biometric sensor 50b can detect the fingerprint of a user. The input from the user can correspond to a request for currency dispensing. For example, the user can enter a personal identification number (PIN), a desired amount of currency, or data associated with a pre-staged transaction through the display 14b or with a smartphone through the transceiver 38b. Alternatively, the user can place his/her finger on the biometric sensor 50b for the ATM 10b to access a pre-staged transaction or confirm identity. Other implementations of the present disclosure can incorporate user interfaces having other forms, such as by way of example and not limitation, a key pad.

The exemplary ATM 10b includes a second transceiver communicating with the user interface, such as second transceiver 34 illustrated schematically in FIG. 1. The second transceiver of the ATM 10b is internal relative to the structure shown in FIGS. 13-15 and therefore not visible. The second transceiver can be configured to receive the input received by the user interface, any of the exemplary user interfaces set forth above. The second transceiver is configured to transmit the input remotely for approval of the request for currency dispensing.

The exemplary ATM 10b includes a shell 54b having an interior 56b sized to at least partially enclose the at least one currency cassette and the currency recycler, referenced by the composite currency unit 52b. The exemplary shell 54b partially encloses the composite currency unit 52b on five sides: top, bottom, left, right, and rear. The exemplary shell 54b is mounted on a plate 58b. In one or more other implementations of the present disclosure, a shell could enclose four sides. The exemplary shell 54b can be formed from sheet metal or plastic and can be relatively thin and light-weight.

The exemplary ATM 10b includes a door 60b configured to selectively close the interior 56b of the shell 54b. In other words, the door 60b is arranged to be moveable between a first position and a second position. In the first position, the door 60b closes an opening 62b in the shell 54b to the interior 56b. The exemplary door 60b closes a sixth side of the shell 54b when in the first position. In the second position, the door 60b is spaced from the first position and the opening 62b in the shell 54b to the interior 56b is unblocked. The door 60b is shown in FIGS. 13-15 in an exemplary second position. As illustrated in the Figures, in the exemplary implementation, the opening 62b to the interior 56b and the user interfaces 14a, 38a, 50a are on the same side of the shell 54b when the opening 62b is closed by the door 60b, the front side. Although not illustrated, it is noted that a lock can be arranged to selectively lock the door 60*b* in the first position. In the exemplary ATM 10*b*, the door 60*b* is mounted on the shell 54*b* for pivoting movement between the first and second positions. Also, the exemplary user interfaces 14*b*, 38*b*, 50*b* are mounted on the door 60*b*.

The exemplary ATM 10*b* includes a slot 28*b* formed in the door 60*b*. The currency recycler, when positioned in the interior 56*b*, is aligned with the slot 28*b* and is configured to direct banknotes that have been extracted from the currency cassette through the slot 28*b*. The exit port of the composite currency unit 52*b* is referenced at 64*b*.

The exemplary ATM 10*b* includes a cart 66*b*. The cart 66*b* has a holding portion 68*b* and a plurality of wheels, such as wheels 70*b*, 74*b*. The exemplary cart 66*b* includes two other wheels opposite to the wheels 70*b*, 74*b*, on an opposite side of the holding portion 68*b*. The holding portion 68*b* rests on the plurality of wheels 70*b*, 74*b* and the wheels that are not shown. The exemplary holding portion 68*b* is supported by the plurality of wheels 70*b*, 74*b* and the wheels that are not shown. The exemplary holding portion 68*b* is carried by the plurality of wheels 70*b*, 74*b* and the wheels that are not shown. The weight of the exemplary holding portion 68*b* is transmitted to the plurality of wheels 70*b*, 74*b* and the wheels that are not shown.

The opening 62*b* in the exemplary shell 54*b* is sized to receive the cart 66*b*. The exemplary cart 66*b* is moveable fully in and fully out of the interior 56*b* of the shell 54*b* while the at least one currency cassette and the currency recycler (combined in the exemplary composite currency unit 52*b*) are carried by the holding portion 68*b* and are resting on the plurality of wheels 70*b*, 74*b* and the wheels that are not shown. Thus, the currency cassette is carried by the holding portion 68*b* and also rests on the plurality of wheels 70*b*, 74*b* and the wheels that are not shown, through the holding portion 68*b*, when the currency cassette is in the interior 56*b*.

The exemplary cart 66*b* and exemplary shell 54*b* are thus selectively engagable with one another. In other words, the exemplary cart 66*b* can be wheeled into the exemplary shell 54*b*, the door 60*b* shut (the first position), and the ATM 10*b* can be used to dispense currency. Further, the exemplary cart 66*b* can be wheeled out of the shell 54*b* and be unconnected with the shell 54*b* without damage to the exemplary cart 66*b* or the exemplary shell 54*b* and reengaged again to accomplish currency dispensing. Further, either the exemplary cart 66*b* or the exemplary shell 54*b* can be replaced with a newer version and engage the remaining component.

The exemplary cart 66*b* includes a handle 100*b* configured to be grasped and held by hand, to be used to pull the cart 66*b* out of the shell 54*b*. The exemplary handle 100*b* is positioned closer to the door 60*b* than the at least one currency cassette 44*b*, which is shown in phantom in FIG. 15. The exemplary handle 100*b* is positioned vertically between the slot 28*b* and the user interface 14*b* when the cart 66*b* is positioned in the interior 56*b*. This allows the handle 100*b* to be easily grasped when needed.

Respective lowermost edges of the plurality of wheels 70*b*, 74*b* and the wheels not visible in the Figures contact a plane such as the plane 78*a* shown in FIG. 5. A lowermost edge of the holding portion 68*b* is in a plane such as the plane 80*a* shown in FIG. 5. A lowermost edge of the at least one currency cassette is no lower than a lowermost edge of the composite currency unit 52*b*, which is in a plane such as the plane 82*a* shown in FIG. 5. The relative positions of planes for the ATM 10*b* are the same as the ATM 10*a*, so FIG. 5 is applicable to the ATM 10*b*. The lowermost edges of the plurality of wheels 70*b*, 74*b* and the wheels not visible in the Figures are positioned lower than the lowermost edge of the holding portion 68*b* because the plane 78*a* is lower than the plane 80*a*. The lowermost edges of the plurality of wheels 70*b*, 74*b* and the wheels not visible in the Figures are positioned lower than the lowermost edge of the currency cassette when the at least one currency cassette is in the interior because the plane 78*a* is lower than the plane 82*a*. Thus, a weight of the at least one currency cassette is not transmitted to any side of the shell 54*b*.

In the exemplary ATM 10*b*, the currency recycler, as part of the composite current unit 52*b*, is also carried by the holding portion 68*b* and also rests on the plurality of wheels 70*b*, 74*b* and the wheels not visible in the Figures, through the holding portion 68*b*, when the currency recycler is in the interior 56*b*. A lowermost edge of the currency recycler is no lower than the lowermost edge of the composite currency unit 52*b*, which is in the plane 82*b*. Therefore, the respective lowermost edges of the plurality of wheels 70*b*, 74*b* and the wheels not visible in the Figures are positioned lower than a lowermost edge of the currency recycler when the currency recycler is in the interior 56*b*.

As best shown in FIG. 15, the exemplary ATM 10*b* also includes a first electrical coupling 96*b* and a second electrical coupling 98*b*. The exemplary first electrical coupling 96*b* is mounted to the door 60*b*. The first electrical coupling 96*b* can include flat contacts. The exemplary second electrical coupling 98*b* is mounted to the currency cassette 44*b*, through the composite currency unit 52*b*. The second electrical coupling 98*b* can include flat contacts. The first electrical coupling 96*b* and the second electrical coupling 98*b* come into contact and electrical engagement with one another when the cart 66*b* is in the interior 56*b* and the door 60*b* has been moved to the first position (the closed position). Electrical data and/or power signals can be communicated through the couplings 96*b*, 98*b*. Such signals can be directed to any component positioned within the composite currency unit 52*b*.

Figure 23:
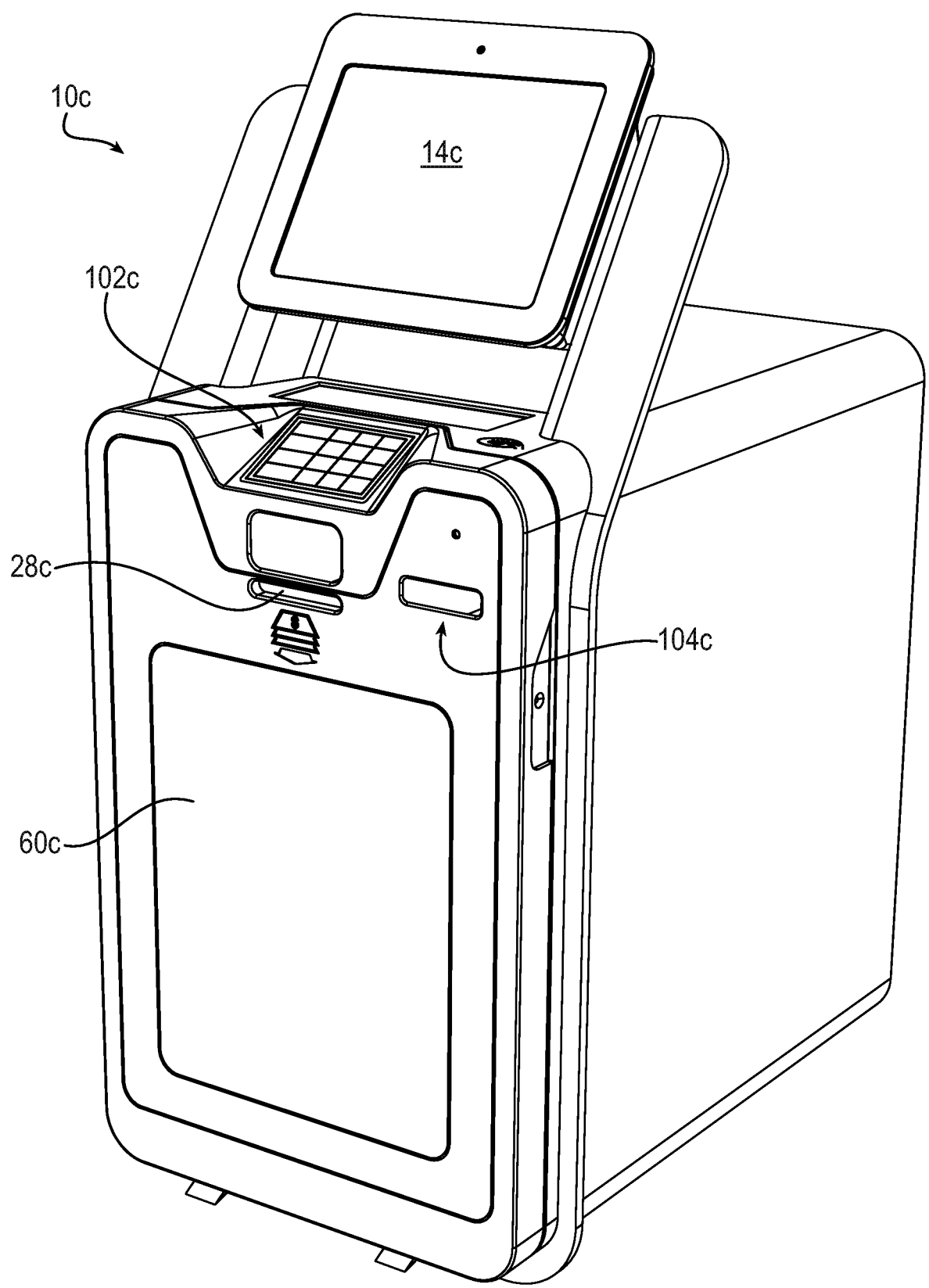
FIG. 23 is a perspective view of an ATM according to an implementation of the present disclosure, the ATM incorporating the cart shown in FIG. 16.
Figure 24:
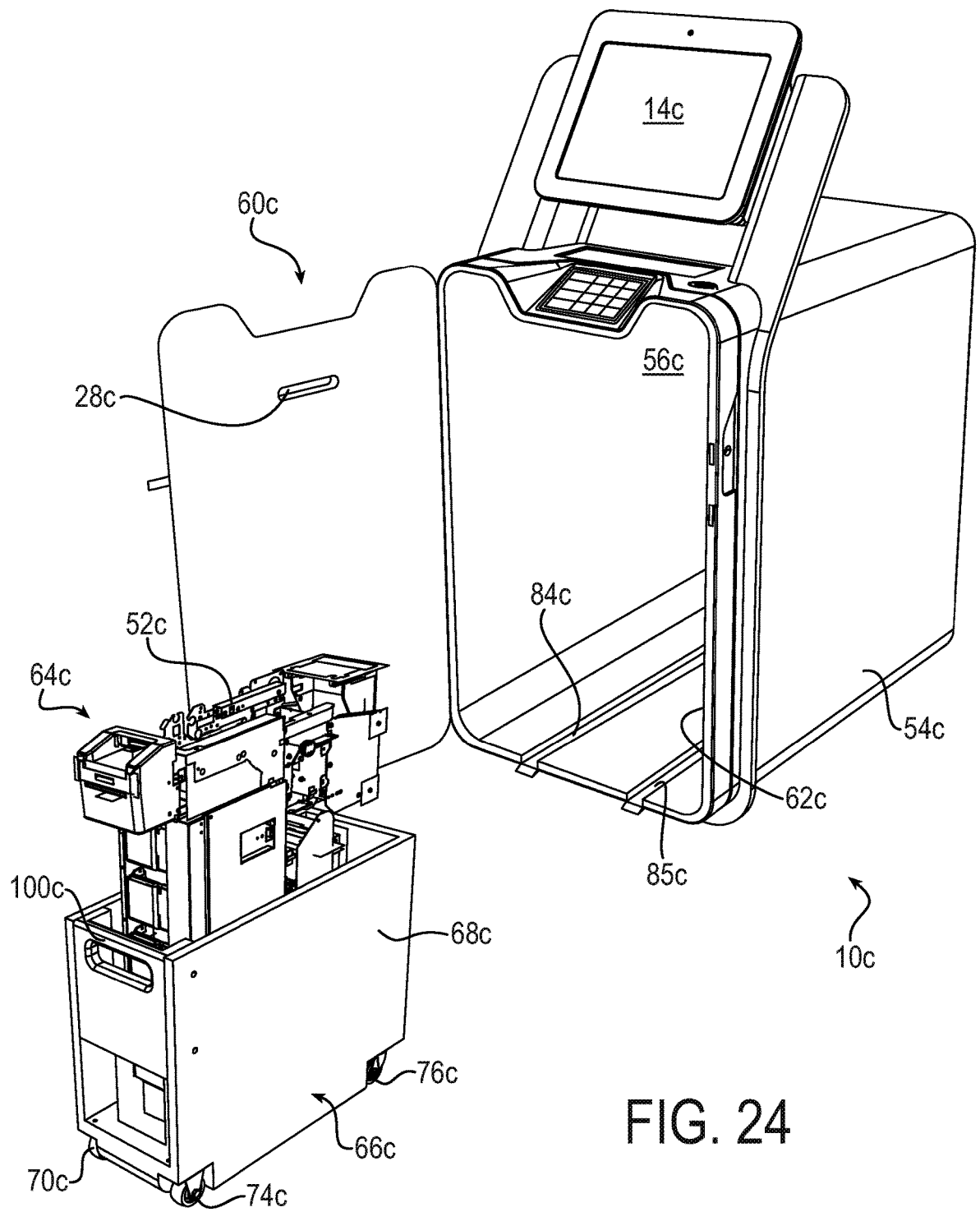
FIG. 24 is a perspective view of the ATM of FIG. 23 with the cart being removed from an interior of a shell of the ATM.

As illustrated in FIGS. 16-24, an exemplary ATM 10*c* includes at least one currency cassette configured to a hold a plurality of banknotes and a currency recycler configured to selectively extract one or more of the plurality of banknotes held by the at least one currency cassette, such as the cassette 44 and dispenser 40 illustrated schematically in FIG. 1. In FIG. 24, a structure containing both of the at least one currency cassette and the currency recycler is referenced at 52*c* in the form of a composite currency unit.

The exemplary ATM 10*c* includes a plurality of user interfaces. A user interface in the form of a display 14*c* is a touch screen display that can display information to a user and receive data from the user. A user interface in the form of a keypad 102*c* can allow a user to enter in a PIN. A user interface in the form of a card reader 104*c* receive a card from a user and read data on the card (from a chip or from a strip). The input from the user can correspond to a request for currency dispensing. For example, the user can enter a personal identification number (PIN), a desired amount of currency, or data associated with a pre-staged transaction. Other implementations of the present disclosure can incorporate user interfaces having other forms.

The exemplary ATM 10*c* includes a second transceiver communicating with the user interface, such as second transceiver 34 illustrated schematically in FIG. 1. The second transceiver of the ATM 10*c* is internal relative to the structure shown in FIGS. 23 and 24 and therefore not visible. The second transceiver can be configured to receive the input received by the user interface, any of the exemplary user interfaces set forth above. The second transceiver is configured to transmit the input remotely for approval of the request for currency dispensing.

The exemplary ATM 10c includes a shell 54c having an interior 56c sized to at least partially enclose the at least one currency cassette and the currency recycler, referenced by the composite currency unit 52c. The exemplary shell 54c partially encloses the composite currency unit 52c on five sides: top, bottom, left, right, and rear.

The exemplary ATM 10c includes a door 60c configured to selectively close the interior 56c of the shell 54c. In other words, the door 60c is arranged to be moveable between a first position and a second position. In the exemplary ATM 10c, the door 60c is mounted on the shell 54c for pivoting movement. In the first position, the door 60c closes an opening 62c in the shell 54c to the interior 56c. The exemplary door 60c closes a sixth side, the front side, of the shell 54c when in the first position. The door 60c is shown in FIG. 23 in the first position. In the second position, the door 60c is spaced from the first position and the opening 62c of the shell 54c to the interior 56c is unblocked. The door 60c is shown in FIG. 24 in an exemplary second position. As illustrated in the Figures, in the exemplary implementation, the opening 62c to the interior 56c and the user interfaces 14c, 102c, 104c are on the same side of the shell 54c when the opening 62c is closed by the door 60c. The exemplary user interfaces 102c and 104c are mounted on the door 60c and the user interface 14c is mounted on the shell 54c. Although not illustrated, it is noted that a lock can be arranged to selectively lock the door 60c in the first position.

The exemplary ATM 10c includes a slot 28c formed in the door 60c. The currency recycler, when positioned in the interior 56c, is aligned with the slot 28c and is configured to direct banknotes that have been extracted from the currency cassette through the slot 28c. The exit port of the composite currency unit 52c is referenced at 64c.

The exemplary ATM 10c includes a cart 66c. The exemplary cart 66c includes a handle 100c configured to be grasped and held by hand and positioned closer to the door 60c than the at least one currency cassette. The exemplary cart 66c also has a holding portion 68c and a plurality of wheels 70c, 72c, 74c, 76c. The holding portion 68c rests on the plurality of wheels 70c, 72c, 74c, 76c. The exemplary holding portion 68c is supported by the plurality of wheels 70c, 72c, 74c, 76c. The exemplary holding portion 68c is carried by the plurality of wheels 70c, 72c, 74c, 76c. The weight of the exemplary holding portion 68c is transmitted to the plurality of wheels 70c, 72c, 74c, 76c.

The opening 62c in the exemplary shell 54c is sized to receive the cart 66c. The exemplary cart 66c is further defined as moveable fully in and fully out of the interior 56c of the shell 54c while the at least one currency cassette and the currency recycler (combined in the exemplary composite currency unit 52c) are carried by the holding portion 68c and resting on the plurality of wheels 70c, 72c, 74c, 76c. Thus, the currency cassette as part of the composite currency unit 52c is carried by the holding portion 68c and thus rests on the plurality of wheels 70c, 72c, 74c, 76c through the holding portion 68c when the currency cassette is in the interior 56c.

The exemplary cart 66c and exemplary shell 54c are thus selectively engagable with one another. In other words, the exemplary cart 66c can be wheeled into the exemplary shell 54c, the door 60c shut (the first position), and the ATM 10 can be used to dispense currency. Further, the exemplary cart 66c can be wheeled out of the shell 54c and be unconnected with the shell 54c when the door 60c is opened, without damage to the exemplary cart 66c or the exemplary shell 54c and reengaged again to accomplish currency dispensing. Further, either the exemplary cart 66c or the exemplary shell 54c can be replaced with a newer version and engage the remaining component.

Figure 16:
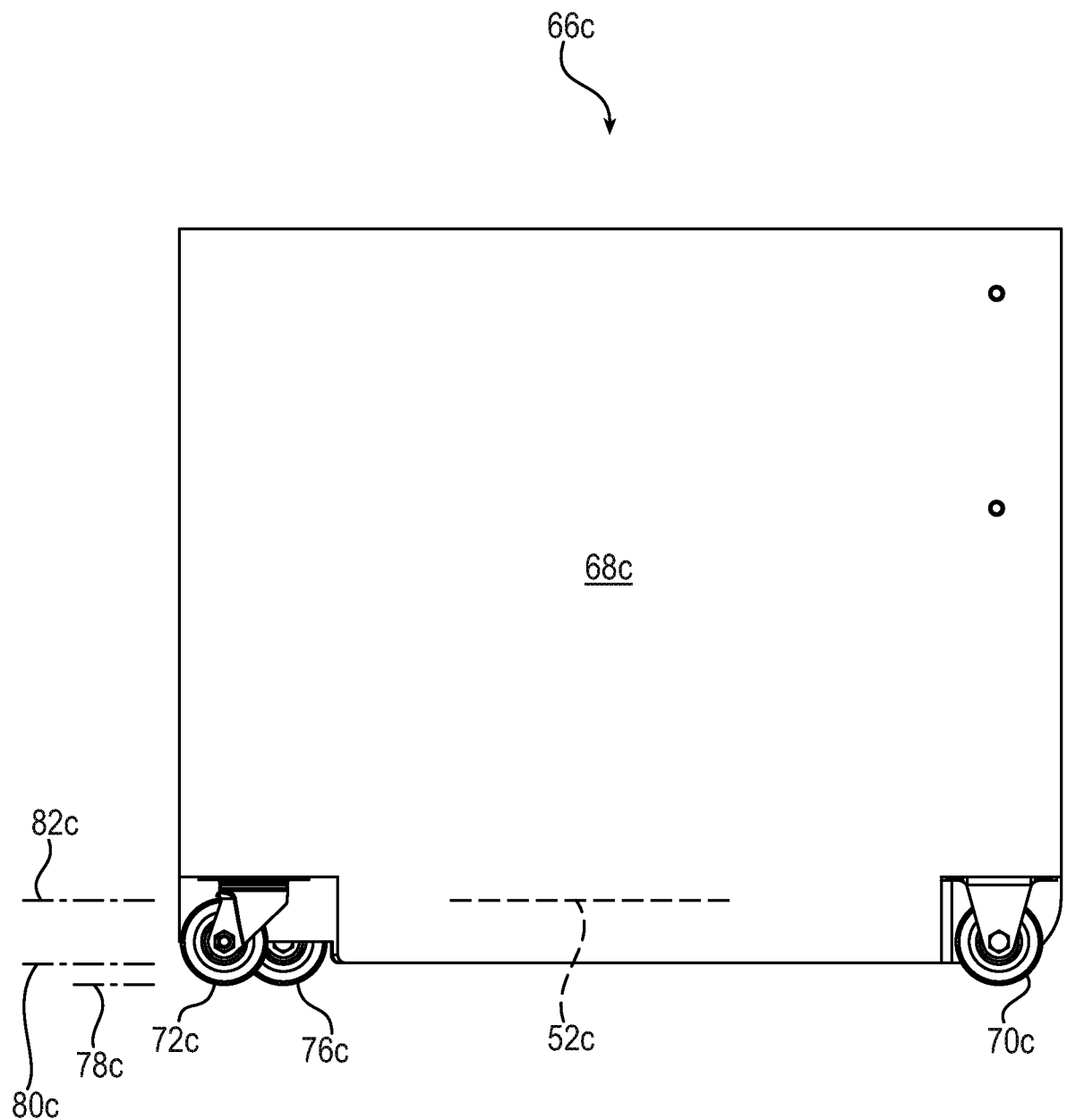
FIG. 16 is a front view of a cart according to another exemplary implementation of the present disclosure.

Respective lowermost edges of the plurality of wheels 70c, 72c, 74c, 76c contact a plane referenced at 78c. A lowermost edge of the holding portion 68c is in a plane referenced at 80c. A lowermost edge of the at least one currency cassette is no lower than a lowermost edge of the composite currency unit 52c, which is in a plane referenced at 82c. The lowermost edge of the exemplary As shown in FIG. 16, the lowermost edges of the plurality of wheels 70c, 72c, 74c, 76c are positioned lower than the lowermost edge of the holding portion 68c because the plane 78c is lower than the plane 80c. As is also shown in FIG. 16, the lowermost edges of the plurality of wheels 70c, 72c, 74c, 76c are positioned lower than the lowermost edge of the currency cassette when the at least one currency cassette is in the interior of the composite currency unit 52c because the plane 78c is lower than the plane 82c. Thus, a weight of the at least one currency cassette is not transmitted to a side of the shell 54c.

In the exemplary ATM 10c, the currency recycler, as part of the composite current unit 52c, is also carried by the holding portion 68c and also rests on the plurality of wheels 70c, 72c, 74c, 76c through the holding portion 68c when the currency recycler is in the interior 56c. A lowermost edge of the currency recycler is no lower than the lowermost edge of the composite currency unit 52c, which is in the plane 82c. Therefore, the respective lowermost edges of the plurality of wheels 70c, 72c, 74c, 76c positioned lower than a lowermost edge of the currency recycler when the currency recycler is in the interior 56c.

The exemplary ATM 10c can also include first and second electrical couplings to deliver power and communicate data to the composite currency unit 52c. The first electrical coupling of the ATM 10c can be mounted to the shell 54c as in the ATM 10a or to the door as in the ATM 10b. The second electrical coupling can be mounted to the currency cassette, the currency recycler or a composite currency unit, as done in the ATM 10b. Alternatively, the second electrical coupling can be mounted to the holding portion 68c, as done in the ATM 10a.

As shown in FIG. 24, the exemplary ATM 10c includes guide tracks 84c, 85c positioned in the interior 56c. The cart 66c engages the guide tracks 84, 85c during movement into the interior 56c. The wheels 70c and 72c engage the guide track 84c during movement within the interior 56c. The wheels 74c and 76c engage the guide track 85c during movement within the interior 56c. The guide tracks 84c, 85c face upwardly and limit movement of the wheels 70c, 72, 74c, 76c so that the cart 66c is guided into a desired position. The cooperation between guide tracks 84c, 85c and the wheels 70c, 72c, 74c, 76c can ensure that mating electrical, mechanical, and electro-mechanical couplings are aligned and couple when the cart 66c is moved into the interior 56c.

Figure 17:
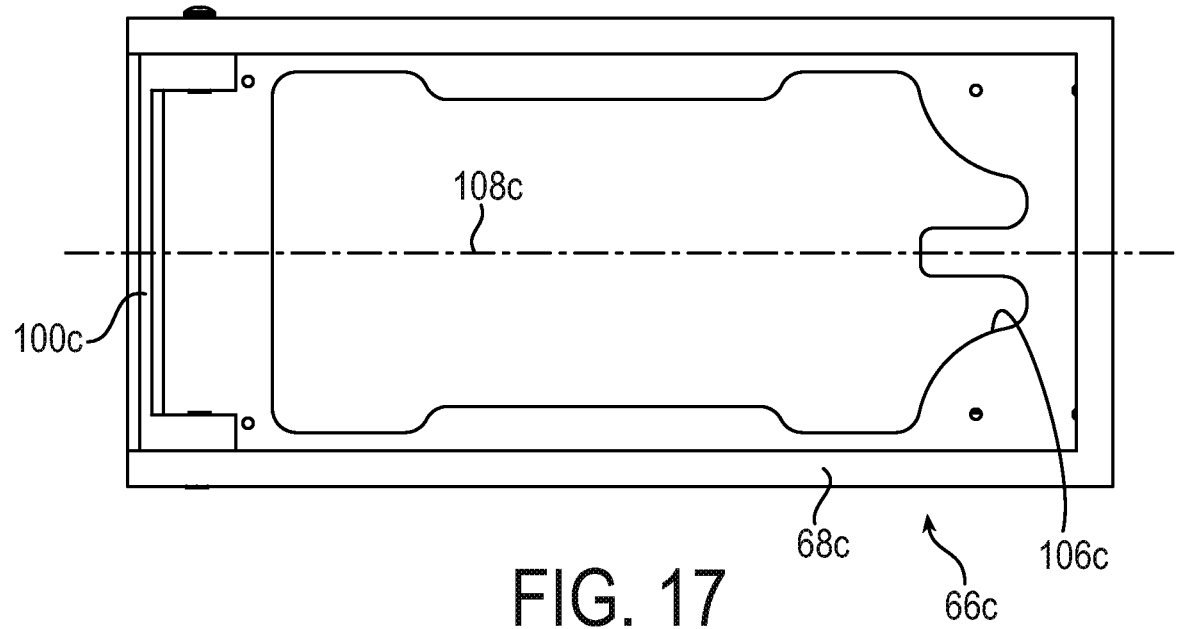
FIG. 17 is a top view of the cart shown in FIG. 16.
Figure 18:
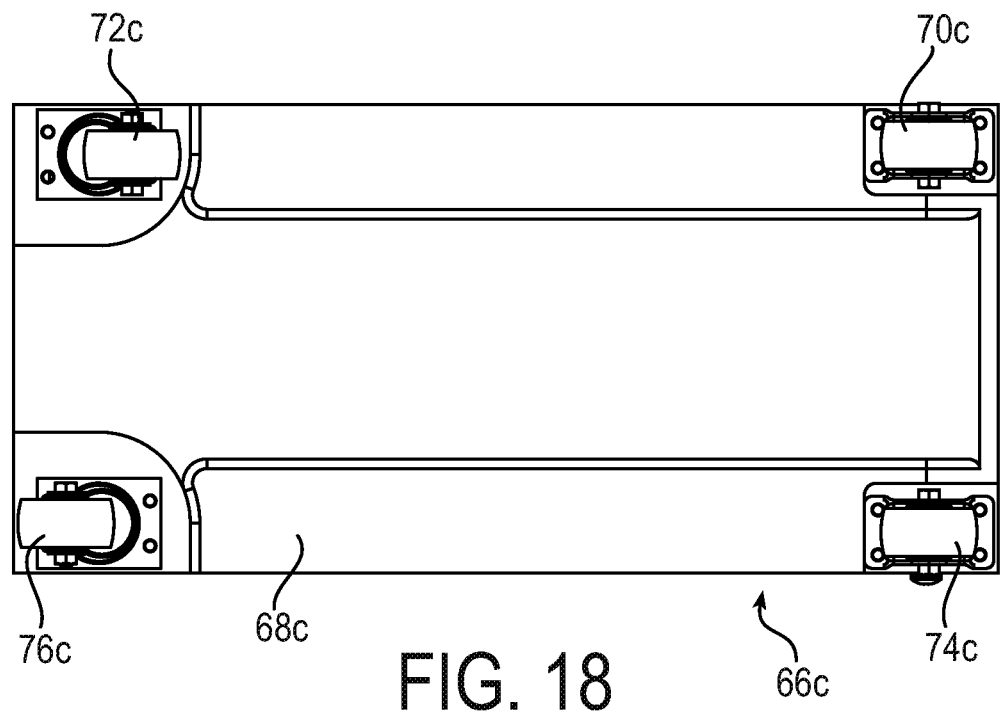
FIG. 18 is a bottom view of the cart shown in FIG. 16.
Figure 20:
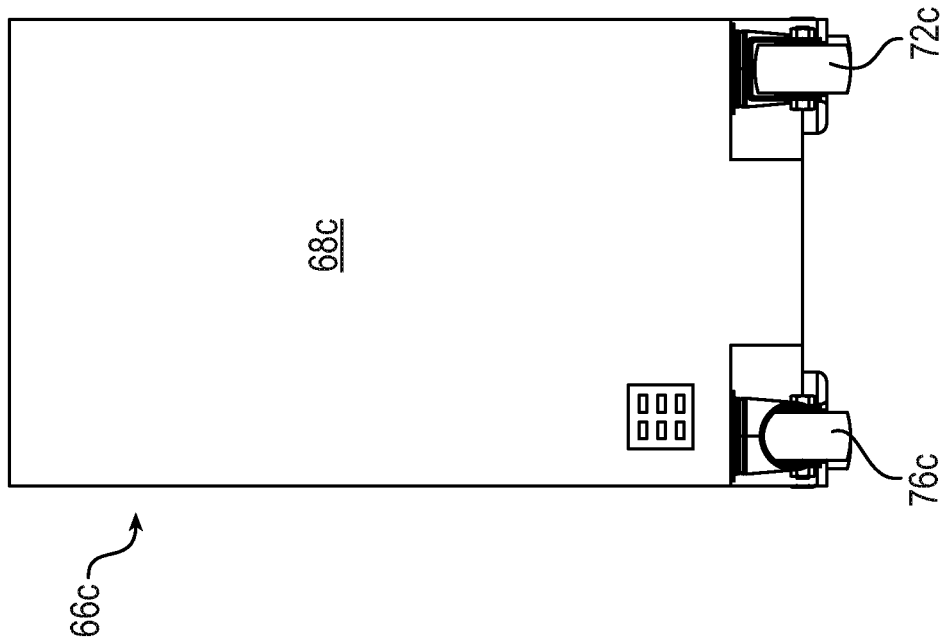
FIG. 20 is a left-hand view of the cart shown in FIG. 16.
Figure 19:
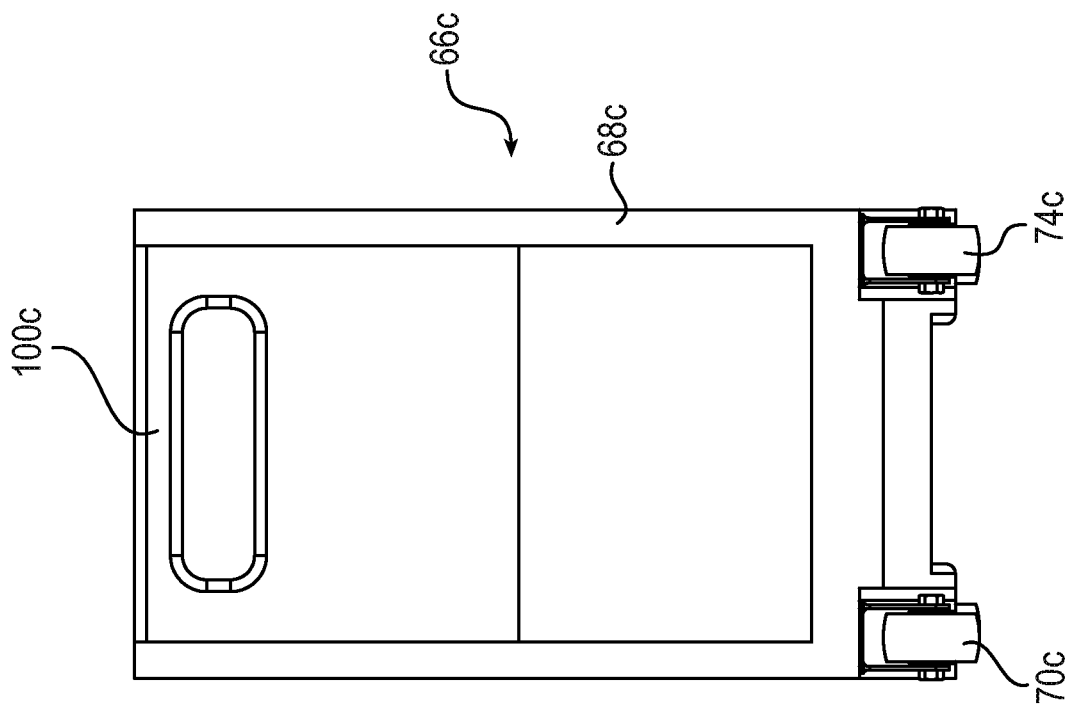
FIG. 19 is a right-hand view of the cart shown in FIG. 16.
Figure 21:
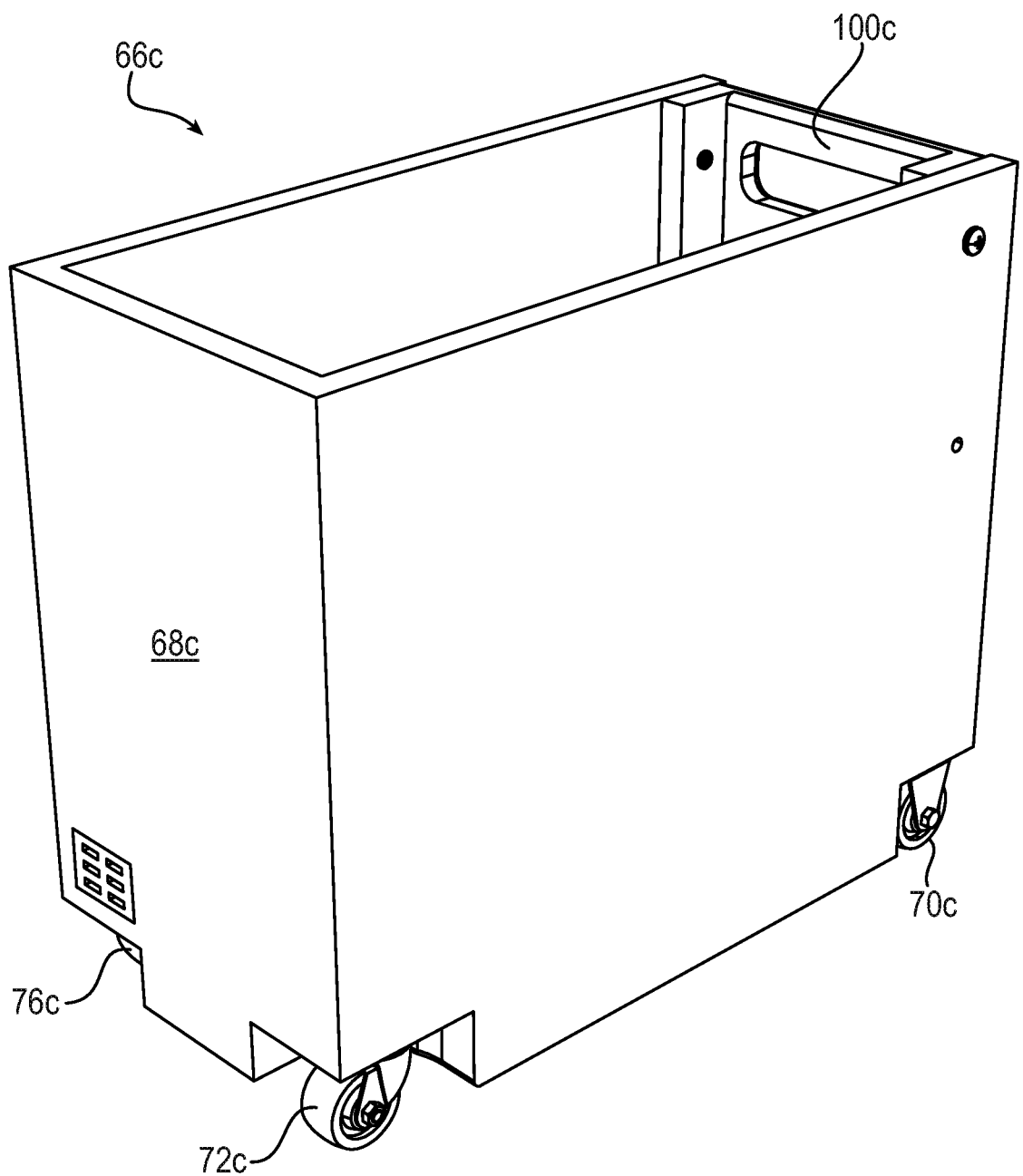
FIG. 21 is a first perspective view of the cart shown in FIG. 16.
Figure 22:
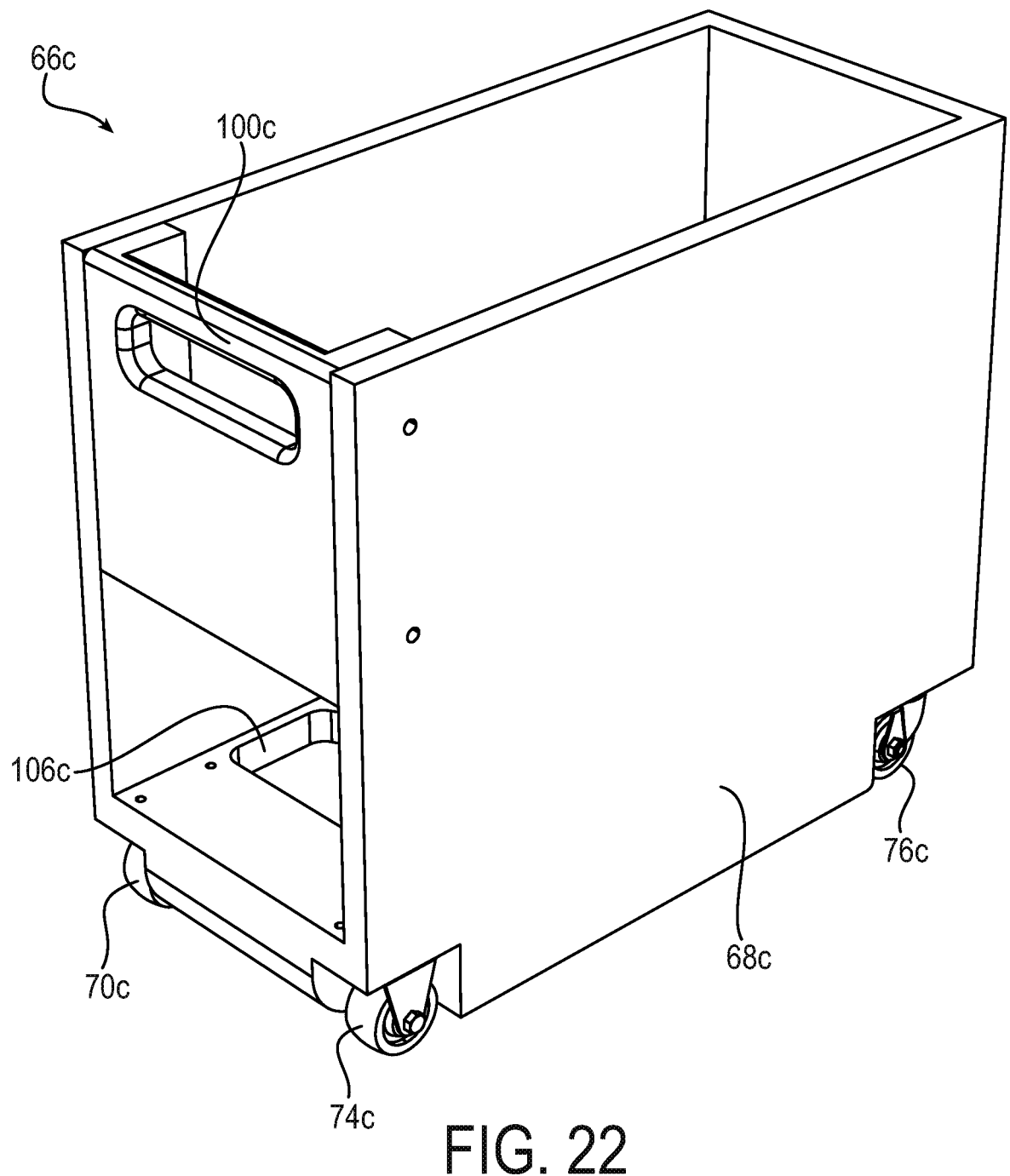
FIG. 22 is a second perspective view of the cart shown in FIG. 16.

The exemplary cart 66c further comprises a depression 106c or cavity, inside the holding portion 68c, that receives the composite currency unit 52c. The exemplary depression 106c is not symmetrical across two or more planes that extend through the depression 106c. The exemplary depression 106c is symmetrical across a single plane that extends through the depression. This plane is referenced at 108c in FIG. 17. The half of the void defined by the depression 106c above the plane 108c in FIG. 17 is symmetrical to or mirrored relative to the half of the void defined by the depression 106c below the plane 108c. It is noted that "above" and "below" are used because of the orientation of FIG. 17. When the cart 66c is in operation and standing upright, these void halves would be viewed as being on alternative sides of the plane 108c, such as the void half on the left side of the plane 108c and the void half on the right side of the plane 108c. The exemplary depression 106c is not symmetrical across two or more planes that extend through the depression 106c so that the composite currency unit 52c can be received in the cart 66c in only one spatial orientation.

In one or more implementations of the present disclosure, only the cash cassette(s) can be carried by a cart such as the carts 66a, 66b, 66c. In such an implementation, when the cart is received in the interior of the shell, portions of the cassette(s) would be aligned with mating electrical, mechanical, and electro-mechanical couplings. For example, a banknote exit port through which banknotes pass would be aligned with an intake port of the currency recycler. Further, any electrical coupling(s) on the cassette for power and data would align with corresponding coupling(s) to a power bus, the computing device of the ATM, the currency recycler, and/or other components of the ATM.

Implementations of the present disclosure can include security protocols to prevent the removal of banknotes from the currency cassette when the cart is removed from the shell. For example, the cassette can include a lock that requires, to unlock, data communication between the cassette and the computing device of the ATM, the currency recycler, and/or other components of the ATM. The cassette can also include an alarm that is battery-powered and activated if the cassette is opened and the cassette is not in data communication between the cassette and the computing device of the ATM, the currency recycler, and/or other components of the ATM.

As illustrated in FIGS. 27-36, a cart 66d can be applied in one or more implementations of the present disclosure. The exemplary cart 66d has a holding portion 68d to receive a composite currency unit 52d, which includes at least one currency cassette configured to a hold a plurality of banknotes and a currency recycler configured to selectively extract one or more of the plurality of banknotes held by the at least one currency cassette. The exit port of the composite currency unit 52d is referenced at 64d. The exemplary cart 66d also includes a plurality of wheels 70d, 72d, 74d, 76d.

The holding portion 68d rests on the plurality of wheels 70d, 72d, 74d, 76d. The exemplary holding portion 68d is supported by the plurality of wheels 70d, 72d, 74d, 76d. The exemplary holding portion 68d is carried by the plurality of wheels 70d, 72d, 74d, 76d. The weight of the exemplary holding portion 68d is transmitted to the plurality of wheels 70d, 72d, 74d, 76d.

Figure 30:
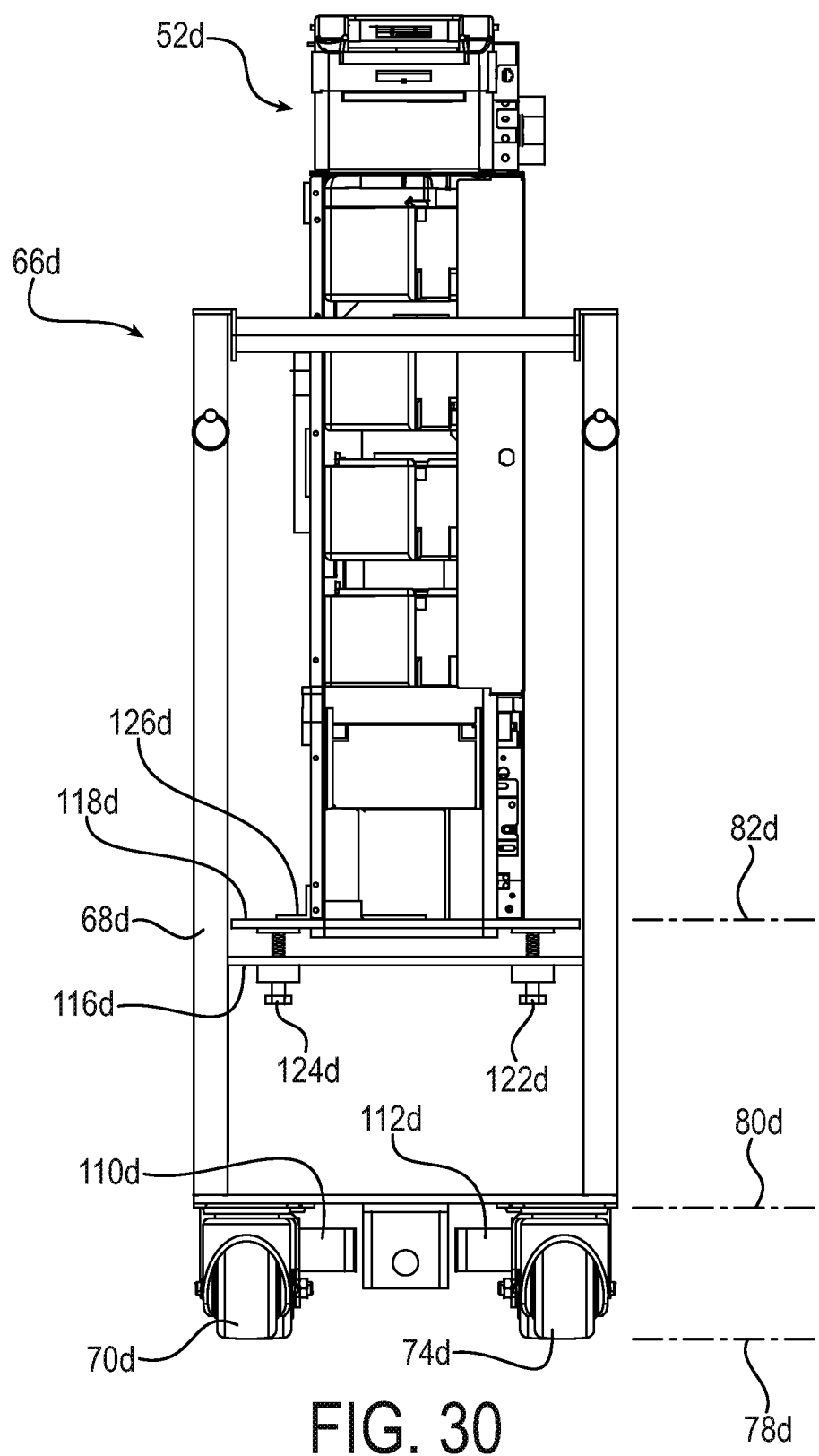
FIG. 30 is a front view of a cart of FIG. 27.
Figure 31:
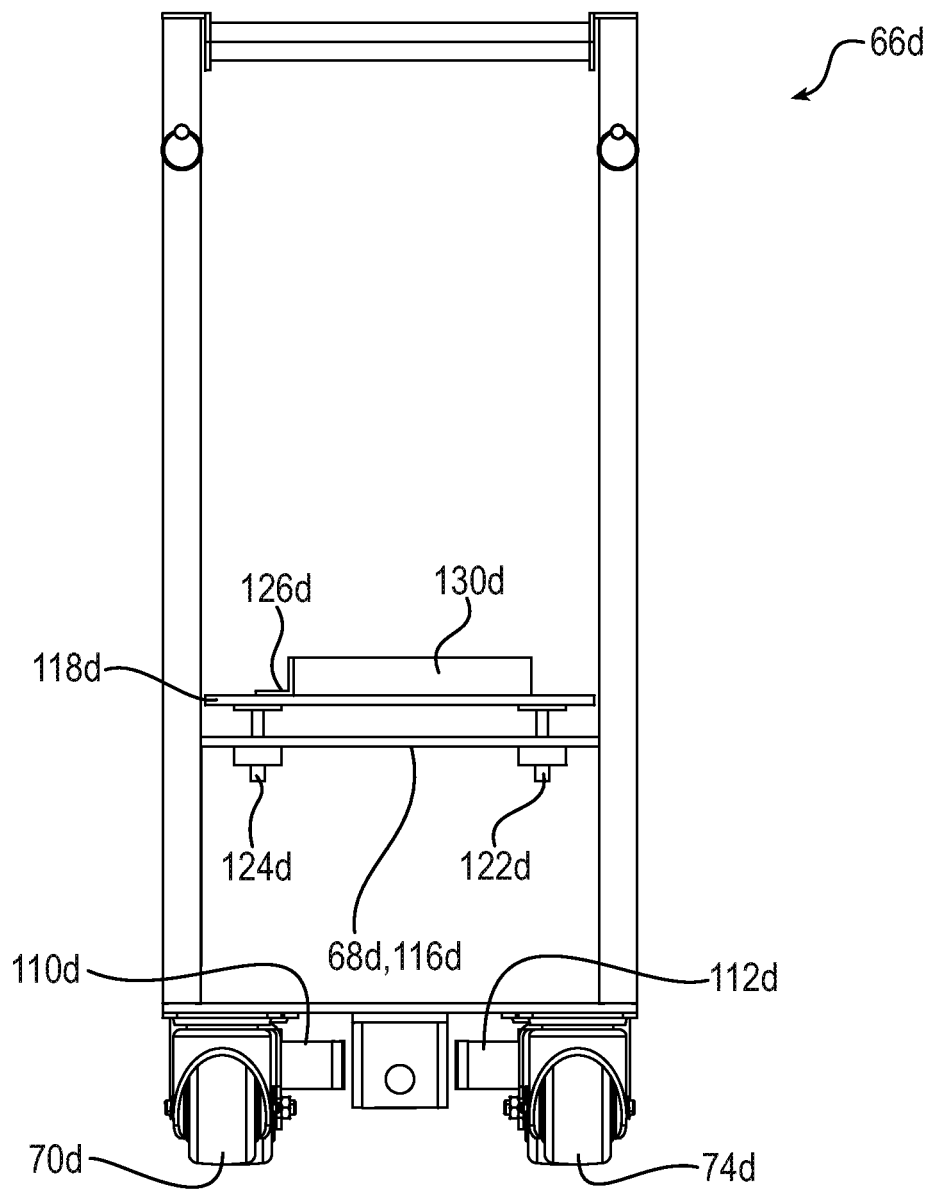
FIG. 31 is a front view of a cart of FIG. 27 with the composite currency unit removed.

Respective lowermost edges of the plurality of wheels 70d, 72d, 74d, 76d contact a plane referenced at 78d, referenced in FIG. 30. A lowermost edge of the holding portion 68d is in a plane referenced at 80d. A lowermost edge of the at least one currency cassette is no lower than a lowermost edge of the composite currency unit 52d, which is in a plane referenced at 82d. As shown in FIG. 30, the lowermost edges of the plurality of wheels 70d, 72d, 74d, 76d are positioned lower than the lowermost edge of the holding portion 68d because the plane 78d is lower than the plane 80d. As is also shown in FIG. 5, the lowermost edges of the plurality of wheels 70d, 72d, 74d, 76d are positioned lower than the lowermost edge of the currency cassette when the at least one currency cassette is in the interior because the plane 78d is lower than the plane 82d. Thus, a weight of the at least one currency cassette is not transmitted to sides of a shell, but to the bottom or floor portion of a shell through the wheels 70d, 72d, 74d, 76d.

In the exemplary implementation, the currency recycler, as part of the composite current unit 52d, is also carried by the holding portion 68d and also rests on the plurality of wheels 70d, 72d, 74d, 76d, through the holding portion 68d, when the currency recycler is in an interior of a shell. A lowermost edge of the currency recycler is no lower than the lowermost edge of the composite currency unit 52d, which is in the plane 82d. Therefore, the respective lowermost edges of the plurality of wheels 70d, 72d, 74d, 76d are positioned lower than a lowermost edge of the currency recycler when the currency recycler is in the interior 56d.

Figure 32:
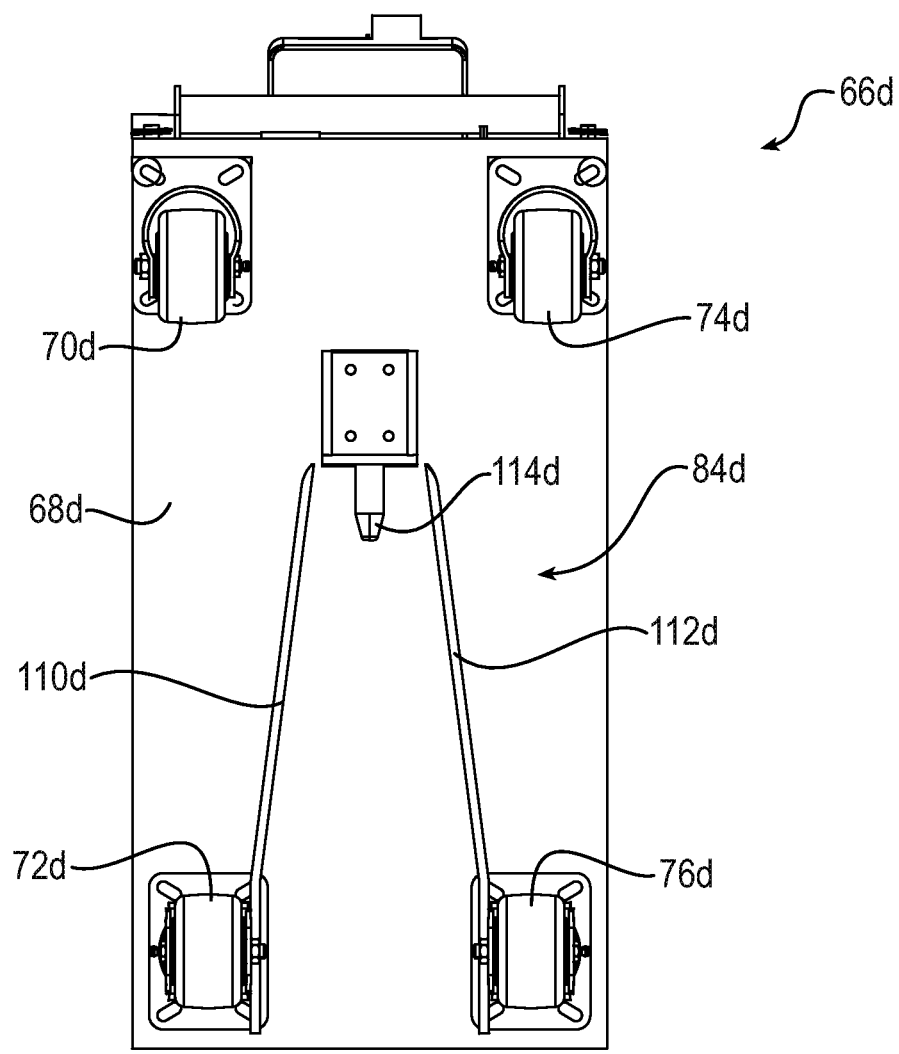
FIG. 32 is a bottom view of a cart of FIG. 27.
Figure 33:
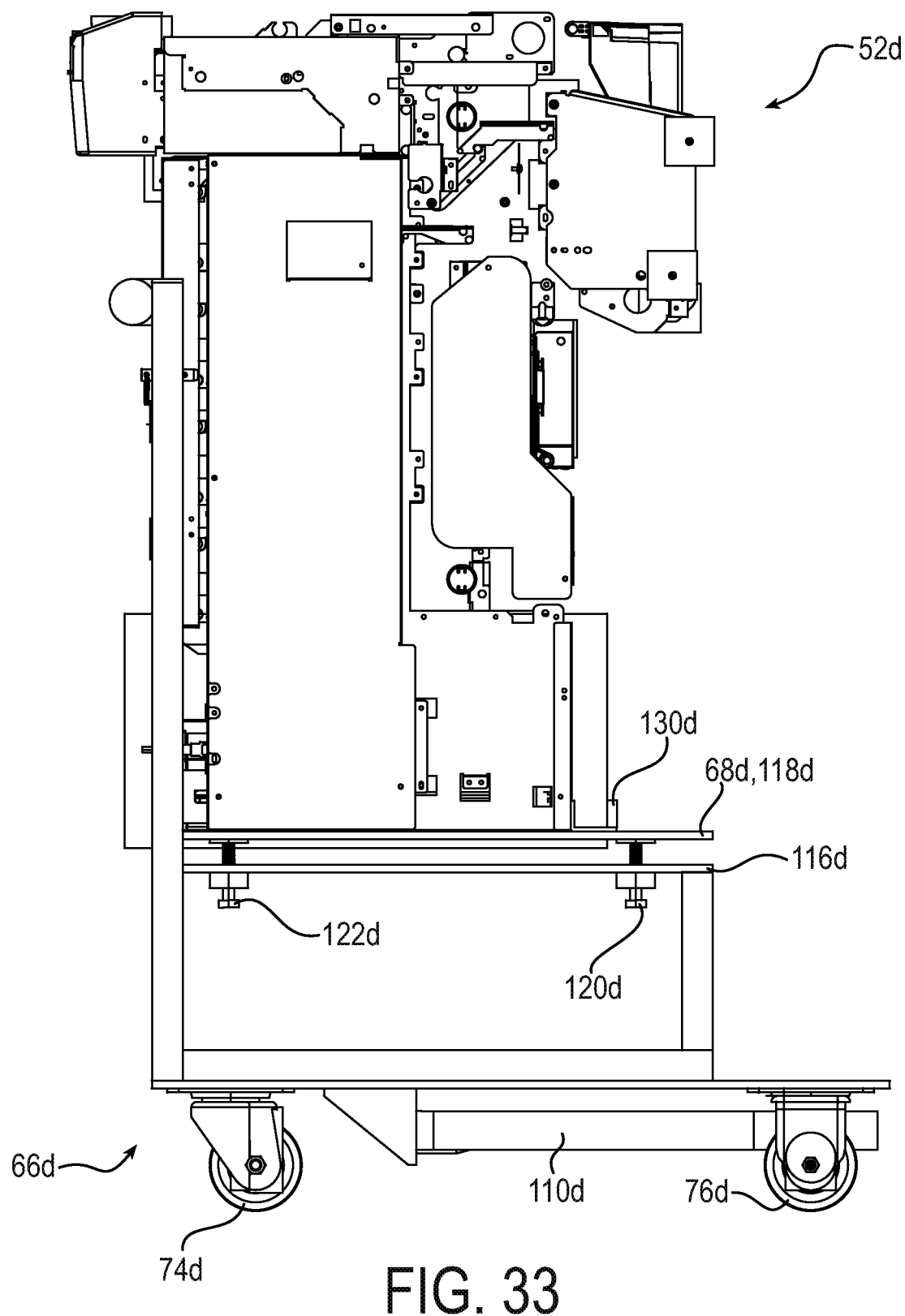
FIG. 33 is a right-side view of a cart of FIG. 27.
Figure 34:
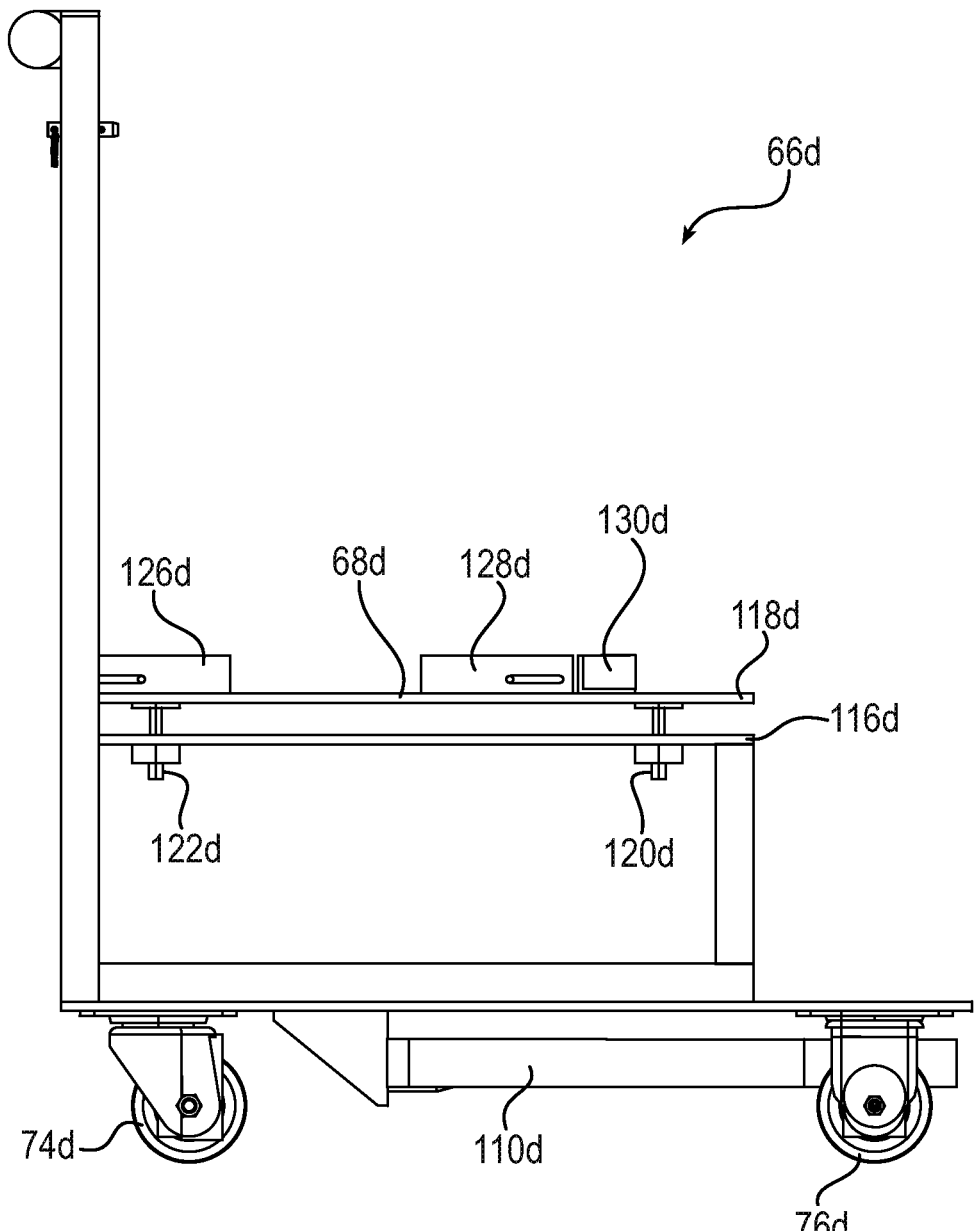
FIG. 34 is a right-side view of a cart of FIG. 27 with the composite currency unit removed.
Figure 35:
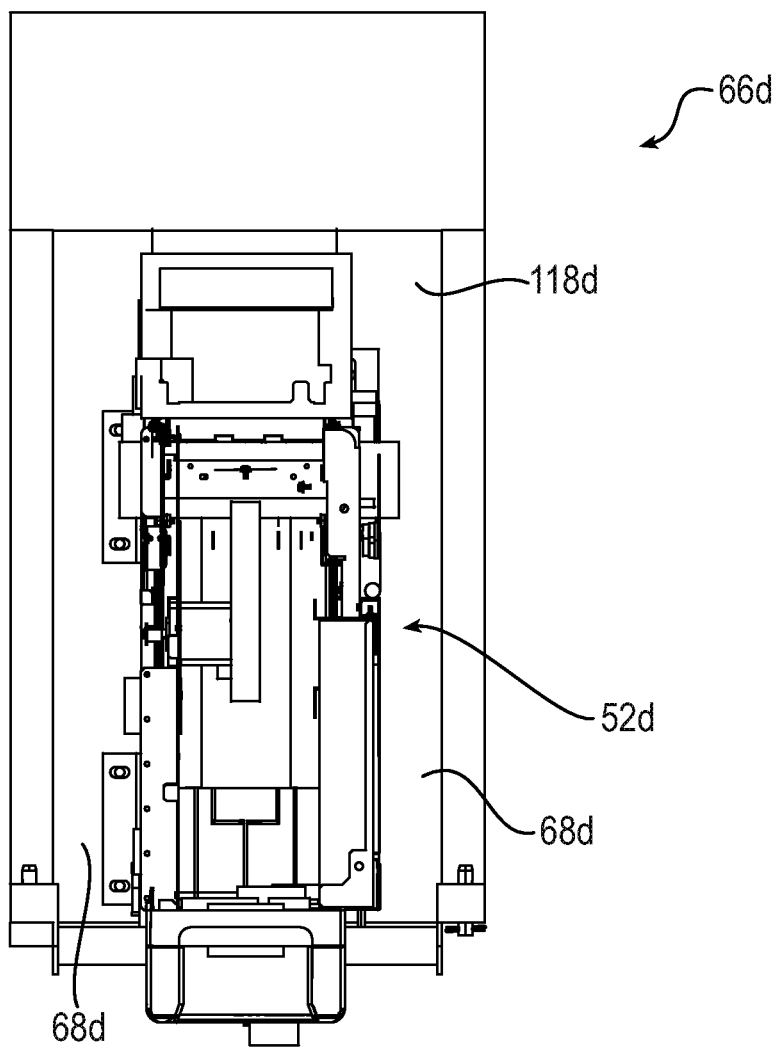
FIG. 35 is a top view of a cart of FIG. 27.
Figure 36:
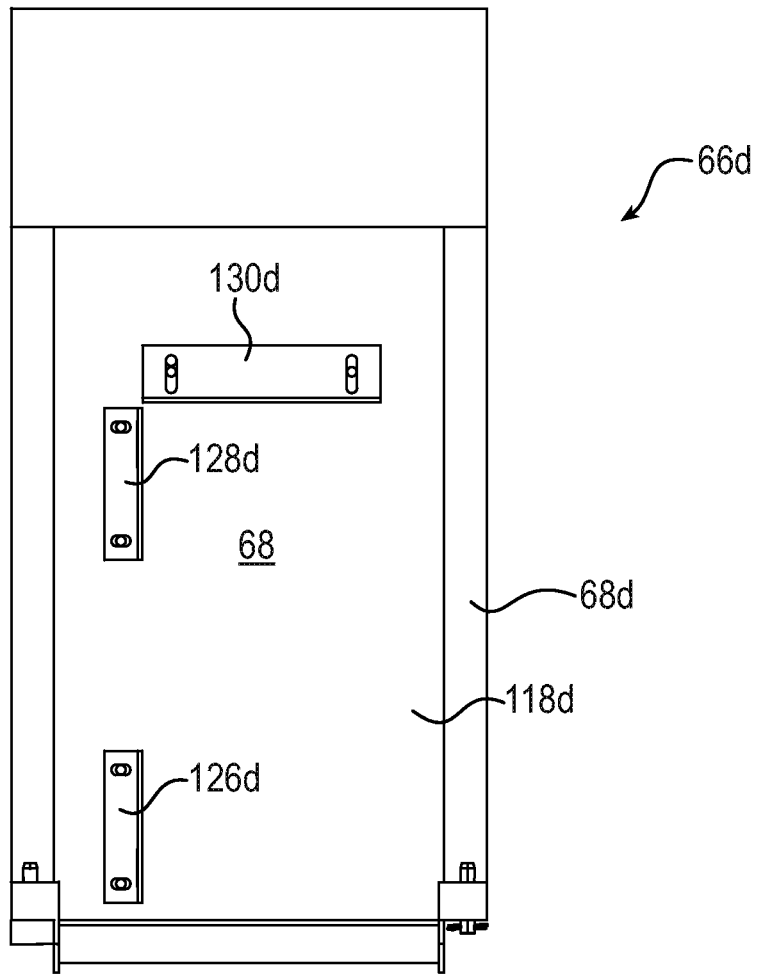
FIG. 36 is a top view of a cart of FIG. 27 with the composite currency unit removed.

The exemplary cart 66d also includes a guide track 84d positioned on an underside of the cart 66d. As best shown in FIG. 32, the exemplary guide track 84 includes walls 110d, 112d. The lateral gap between the walls 110d, 112d narrows from the rear of the cart 66d to the front of the cart 66d. The walls 110d, 112d can engage a structure in the shell during movement into the interior of the shell to progressively position the cart 66d as desired.

The exemplary cart 66d also includes a post 114d fixedly mounted on the underside at the narrowest lateral width between the walls 110d, 112d. The guide track 84d engages a portion of a shell or a component mounted on the shell during movement into the interior of the shell. The post 114d can engage a corresponding aperture formed in the shell or a component mounted on the shell during movement into the interior of the shell to precisely position the cart 66d as desired.

The cart 66d can also include structures to adjust a position the composite currency unit 52d on the holding portion 68d. For example, the exemplary cart 66d includes a base plate 116d, a setting plate 118d, and set screws 120d, 122d, 124d. The composite currency unit 52d can rest on the setting plate 118d. The setting plate 118d can be moveably mounted on and guided in motion by the remainder of the holding portion 68d. The base plate 116d can be fixedly positioned. The set screws 120d, 122d, 124d can be rotated as desired to raise or lower the setting plate 118d relative to the base plate 116d, in order to adjust a height of the composite currency unit 52d from the plane 78d. For example, the height of the composite currency unit 52d can be adjusted in order to align the exit port 64d with a slot in the door of the ATM.

The exemplary cart 66d also includes jigs to adjustably, laterally position the composite currency unit 52d on the holding portion 68d. For example, exemplary jig brackets 126d, 128d, 130d are mounted on the setting plate 118d with fasteners, such as bolts. The bolts can be untightened to change respective positions of the jig brackets 126d, 128d, 130d on the setting plate 118d. When the jig brackets 126d, 128d, 130d are positioned on the setting plate 118d as desired, the bolts can be tightened to fix the respective positions to fix the jig brackets 126d, 128d, 130d to the setting plate 118d. The lateral position of the composite currency unit 52d can be adjusted to align the exit port 64d with the slot in the door of the ATM.

While the present disclosure has been described with reference to an exemplary implementation, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular implementation disclosed as the best mode contemplated for carrying out this present disclosure, but that the present disclosure will include all implementations falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an implementation of an invention recited in a patent claim.

What is claimed is:

1. An automated transaction machine (ATM) comprising:
   at least one currency cassette configured to a hold a plurality of banknotes;
   a currency recycler configured to selectively extract one or more of the plurality of banknotes held by said at least one currency cassette;
   a user interface configured to receive an input from a user, the input corresponding to at least part of a request for currency dispensing;
   a transceiver communicating with said user interface and configured to receive the input and transmit the input remotely for approval of the request for currency dispensing;
   a shell having an interior sized to at least partially enclose said at least one currency cassette and said currency recycler;
   a door configured to selectively close said interior of said shell;
   a slot formed in said door, wherein said currency recycler, when positioned in said interior, is aligned with said slot and is configured to direct the one or more banknotes extracted from said at least one currency cassette through said slot;
   a cart having a holding portion and a plurality of wheels, said holding portion resting on said plurality of wheels, said shell having an opening sized to receive said cart, wherein said at least one currency cassette is carried by said holding portion and also rests on said plurality of wheels through said holding portion when said at least one currency cassette is in said interior, respective lowermost edges of said plurality of wheels positioned lower than a lowermost edge of said holding portion and lower than a lowermost edge of said at least one currency cassette when said at least one currency cassette is in said interior; and
   wherein said user interface is carried by said holding portion and also rests on said plurality of wheels through said holding portion when said currency recycler is in said interior, said respective lowermost edges of said plurality of wheels positioned lower than a lowermost edge of said user interface.

2. The ATM of claim 1 wherein said user interface is mounted on said door.

3. The ATM of claim 1 wherein a weight of said at least one currency cassette is not transmitted to a side of said shell.

4. The ATM of claim 1 wherein said opening to said interior and said user interface are on the same side of said shell when said opening is closed by said door.

5. The ATM of claim 1 wherein said currency recycler is carried by said holding portion and also rests on said plurality of wheels through said holding portion when said currency recycler is in said interior, said respective lowermost edges of said plurality of wheels positioned lower than a lowermost edge of said currency recycler when said currency recycler is in said interior.

6. The ATM of claim 1 further comprising:
   a first electrical coupling; and
   a second electrical coupling, wherein said first electrical coupling is further defined as mounted to said shell, said second electrical coupling if further defined as mounted to said holding portion, and said first electrical coupling and said second electrical coupling come into engagement with one another when one of said cart is rolled into said interior.

7. The ATM of claim 1 further comprising:
   a guide track positioned in said interior, wherein said cart engages said guide track during movement into said interior, wherein said guide track faces upwardly and at least one of said plurality of wheels engages said guide track during movement within said interior.

8. The ATM of claim 1 further comprising:
   a guide track positioned on said cart, wherein guide track engages said shell during movement into said interior.

9. The ATM of claim 1 wherein said cart further comprises:
   a handle configured to be grasped and held by hand and positioned closer to said door than said at least one currency cassette, wherein said handle is positioned vertically between said slot and said user interface when said cart is positioned in said interior.

10. The ATM of claim 1 wherein said cart further comprises a depression that is not symmetrical across two or more planes that extend through said depression.

11. The ATM of claim 1 further comprising:
    a second opening in said shell to said interior; and
    a hatch mounted on said shell, spaced from said door, said hatch moveable between a first position closing said second opening and second position spaced from said first position, wherein said at least one currency cassette is accessible through said second opening.

12. An automated transaction machine (ATM) comprising:
    at least one currency cassette configured to a hold a plurality of banknotes;
    a currency recycler configured to selectively extract one or more of the plurality of banknotes held by said at least one currency cassette;
    a user interface configured to receive an input from a user, the input corresponding to at least part of a request for currency dispensing;
    a transceiver communicating with said user interface and configured to receive the input and transmit the input remotely for approval of the request for currency dispensing;
    a shell having an interior sized to at least partially enclose said at least one currency cassette and said currency recycler;
    a door configured to selectively close said interior of said shell;
    a slot formed in said door, wherein said currency recycler, when positioned in said interior, is aligned with said slot and is configured to direct the one or more banknotes extracted from said at least one currency cassette through said slot;

a cart having a holding portion and a plurality of wheels, said holding portion resting on said plurality of wheels, said shell having an opening sized to receive said cart, wherein said at least one currency cassette is carried by said holding portion and also rests on said plurality of wheels through said holding portion when said at least one currency cassette is in said interior, respective lowermost edges of said plurality of wheels positioned lower than a lowermost edge of said holding portion and lower than a lowermost edge of said at least one currency cassette when said at least one currency cassette is in said interior; and wherein said door is carried by said holding portion and also rests on said plurality of wheels through said holding portion when said door closing said interior.

13. The ATM of claim 12 wherein a weight of said at least one currency cassette is not transmitted to a side of said shell.

14. The ATM of claim 12 wherein said currency recycler is carried by said holding portion and also rests on said plurality of wheels through said holding portion when said currency recycler is in said interior, said respective lowermost edges of said plurality of wheels positioned lower than a lowermost edge of said currency recycler when said currency recycler is in said interior.

15. The ATM of claim 12 wherein said user interface is mounted on said door.

16. The ATM of claim 12 further comprising:
a first electrical coupling; and
a second electrical coupling, wherein said first electrical coupling is further defined as mounted to said shell, said second electrical coupling if further defined as mounted to said holding portion, and said first electrical coupling and said second electrical coupling come into engagement with one another when one of said cart is rolled into said interior.

17. The ATM of claim 12 wherein said cart further comprises a depression that is not symmetrical across two or more planes that extend through said depression.

18. The ATM of claim 12 further comprising:
a second opening in said shell to said interior; and
a hatch mounted on said shell, spaced from said door, said hatch moveable between a first position closing said second opening and second position spaced from said first position, wherein said at least one currency cassette is accessible through said second opening.

19. An automated transaction machine (ATM) comprising:
at least one currency cassette configured to a hold a plurality of banknotes;
a currency recycler configured to selectively extract one or more of the plurality of banknotes held by said at least one currency cassette;
a user interface configured to receive an input from a user, the input corresponding to at least part of a request for currency dispensing;
a transceiver communicating with said user interface and configured to receive the input and transmit the input remotely for approval of the request for currency dispensing;
a shell having an interior sized to at least partially enclose said at least one currency cassette and said currency recycler;
a door configured to selectively close said interior of said shell;
a slot formed in said door, wherein said currency recycler, when positioned in said interior, is aligned with said slot and is configured to direct the one or more banknotes extracted from said at least one currency cassette through said slot;
a cart having a holding portion and a plurality of wheels, said holding portion resting on said plurality of wheels, said shell having an opening sized to receive said cart, wherein said at least one currency cassette is carried by said holding portion and also rests on said plurality of wheels through said holding portion when said at least one currency cassette is in said interior, respective lowermost edges of said plurality of wheels positioned lower than a lowermost edge of said holding portion and lower than a lowermost edge of said at least one currency cassette when said at least one currency cassette is in said interior;
a first electrical coupling mounted to one of said shell and said door; and
a second electrical coupling mounted to one of said at least one currency cassette and said holding portion, wherein said first electrical coupling and said second electrical coupling come into engagement with one another when one of said cart is rolled into said interior and said door is moved to close said interior; and
wherein said first electrical coupling is further defined as mounted to said door and said first electrical coupling and said second electrical coupling come into engagement with one another when said door is moved to close said interior.

20. The ATM of claim 19 wherein a weight of said at least one currency cassette is not transmitted to a side of said shell.

21. The ATM of claim 19 wherein said currency recycler is carried by said holding portion and also rests on said plurality of wheels through said holding portion when said currency recycler is in said interior, said respective lowermost edges of said plurality of wheels positioned lower than a lowermost edge of said currency recycler when said currency recycler is in said interior.

22. The ATM of claim 19 wherein said user interface is mounted on said door.

23. The ATM of claim 19 wherein said cart further comprises a depression that is not symmetrical across two or more planes that extend through said depression.

24. The ATM of claim 19 further comprising:
a second opening in said shell to said interior; and
a hatch mounted on said shell, spaced from said door, said hatch moveable between a first position closing said second opening and second position spaced from said first position, wherein said at least one currency cassette is accessible through said second opening.

25. An automated transaction machine (ATM) comprising:
at least one currency cassette configured to a hold a plurality of banknotes;
a currency recycler configured to selectively extract one or more of the plurality of banknotes held by said at least one currency cassette;
a user interface configured to receive an input from a user, the input corresponding to at least part of a request for currency dispensing;
a transceiver communicating with said user interface and configured to receive the input and transmit the input remotely for approval of the request for currency dispensing;
a shell having an interior sized to at least partially enclose said at least one currency cassette and said currency recycler;

a door configured to selectively close said interior of said shell;

a slot formed in said door, wherein said currency recycler, when positioned in said interior, is aligned with said slot and is configured to direct the one or more banknotes extracted from said at least one currency cassette through said slot;

a cart having a holding portion and a plurality of wheels, said holding portion resting on said plurality of wheels, said shell having an opening sized to receive said cart, wherein said at least one currency cassette is carried by said holding portion and also rests on said plurality of wheels through said holding portion when said at least one currency cassette is in said interior, respective lowermost edges of said plurality of wheels positioned lower than a lowermost edge of said holding portion and lower than a lowermost edge of said at least one currency cassette when said at least one currency cassette is in said interior; and wherein said door is mounted on said shell for pivoting movement and wherein said user interface is mounted on said door.

26. The ATM of claim 25 wherein a weight of said at least one currency cassette is not transmitted to a side of said shell.

27. The ATM of claim 25 wherein said currency recycler is carried by said holding portion and also rests on said plurality of wheels through said holding portion when said currency recycler is in said interior, said respective lowermost edges of said plurality of wheels positioned lower than a lowermost edge of said currency recycler when said currency recycler is in said interior.

28. The ATM of claim 25 further comprising:

a first electrical coupling; and a second electrical coupling, wherein said first electrical coupling is further defined as mounted to said shell, said second electrical coupling if further defined as mounted to said holding portion, and said first electrical coupling and said second electrical coupling come into engagement with one another when one of said cart is rolled into said interior.

29. The ATM of claim 25 wherein said cart further comprises a depression that is not symmetrical across two or more planes that extend through said depression.

30. The ATM of claim 25 further comprising:

a second opening in said shell to said interior; and a hatch mounted on said shell, spaced from said door, said hatch moveable between a first position closing said second opening and second position spaced from said first position, wherein said at least one currency cassette is accessible through said second opening.

* * * * *